United States Patent
Farrell et al.

[15] 3,667,503
[45] June 6, 1972

[54] SINGLE-HANDLE MIXING AND PROPORTIONING VALVE

[72] Inventors: Gerald J. Farrell, Elmhurst; Frank J. Bartos, Chicago, both of Ill.

[73] Assignee: Elkay Manufacturing Company, Broadview, Ill.

[22] Filed: June 5, 1970

[21] Appl. No.: 43,911

[52] U.S. Cl. ............................................. 137/625.4
[51] Int. Cl. ............................................. F16k 11/00
[58] Field of Search ........................... 137/625.4, 625.42

[56] References Cited

UNITED STATES PATENTS

| | | | |
|---|---|---|---|
| 2,601,966 | 7/1952 | Busick | 137/625.42 X |
| 3,250,296 | 5/1966 | Perlman | 137/625.4 |
| 3,384,119 | 5/1968 | Manoogian | 137/625.4 |
| 3,415,281 | 12/1968 | Perlman | 137/625.4 |
| 3,435,849 | 4/1969 | Von Corpon | 137/625.4 |
| 3,476,149 | 11/1969 | Dornaus | 137/625.4 |
| 3,512,547 | 5/1970 | Gibbs et al. | 137/625.4 X |
| 3,526,250 | 9/1970 | Miller | 137/625.4 |
| 3,533,436 | 10/1970 | Parkison | 137/625.4 X |

*Primary Examiner*—Samuel Scott
*Attorney*—Prangley, Clayton, Mullin, Dithmar & Vogel

[57] ABSTRACT

There are disclosed two embodiments of a water faucet mixing and proportioning valve including a housing defining a valve seat having hot and cold water inlet ports and an outlet port, a valve plate having a mixing cavity cooperating with the inlet and outlet ports to control the flow therethrough, a bearing mounted on the housing for pivotal movement about an axis, and a lever pivotally mounted on the bearing and having a handle at one end and coupled at the other end to the valve plate for movement thereof, the lever being limited to pivotal movement with the bearing about the axis for accommodating curvilinear hand movement and rectilinear valve plate movement between full-off and full-on positions and being limited to pivotal movement with respect to the bearing in a direction parallel to the axis for accommodating rectilinear movement of the valve plate between full-hot and full-cold positions; seals and hydraulic seal loading means are also provided.

21 Claims, 19 Drawing Figures

INVENTORS
GERALD J. FARRELL
FRANK J. BARTOS

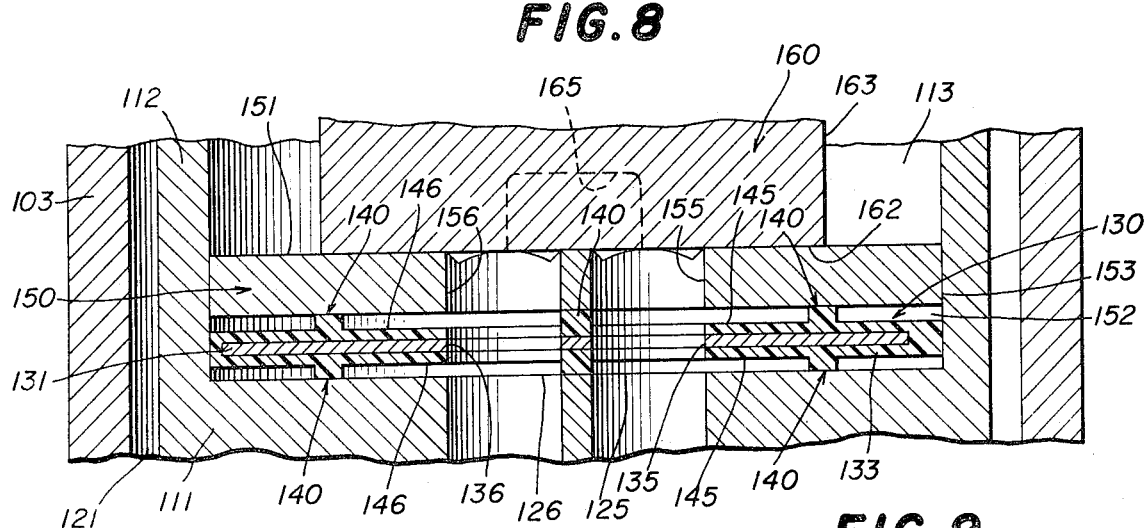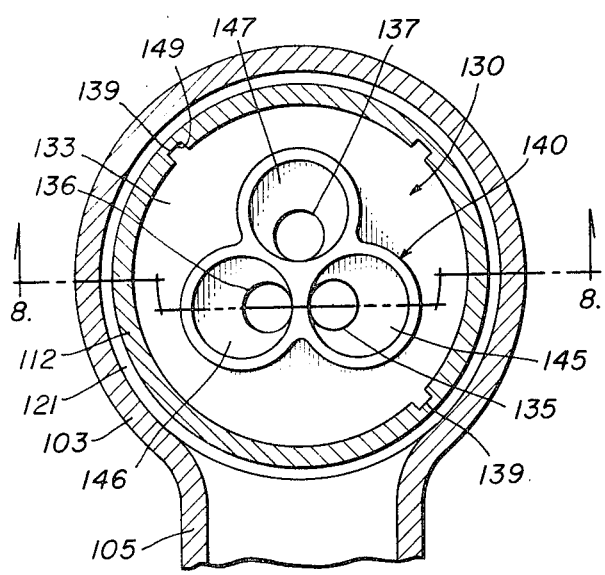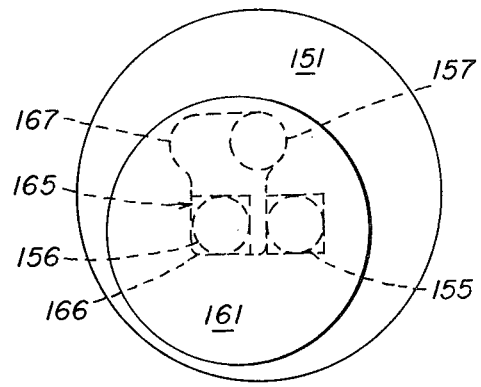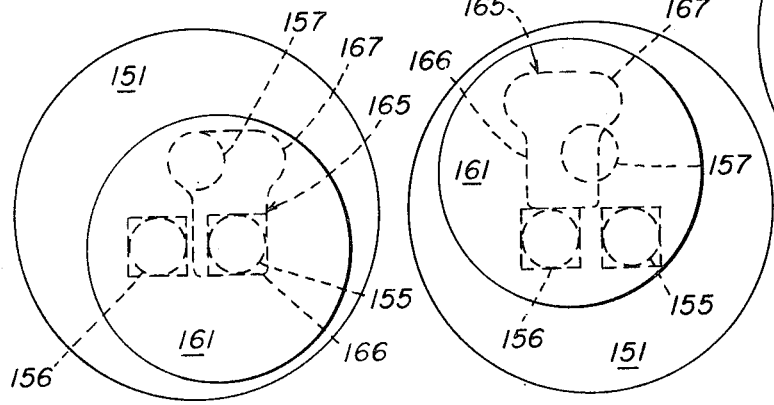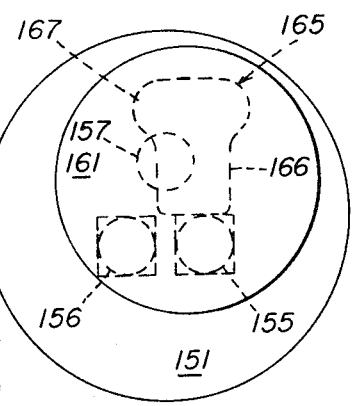

SINGLE-HANDLE MIXING AND PROPORTIONING VALVE

This invention relates to a single-handle mixing and proportioning valve structure.

A general object of this invention is to provide a single-handle mixing and proportioning valve of simple and economical construction for use with hot and cold water outlets.

It is another object of this invention to provide a valve structure of the type set forth operating to mix hot and cold water in any desired proportions and to dispense the mixed fluids in a desired volume from zero flow to full flow for any degree of proportioning without changing the degree of proportioning.

More particularly, it is an important object of this invention to provide a single-handle mixing and proportioning valve comprising a housing defining therein a chamber provided with first and second fluid inlet ports for respectively delivering first and second fluids and a fluid outlet port spaced from the fluid inlet ports, a valve seat in the housing at one end of the chamber and disposed between the inlet ports and the outlet port, a seal member mounted in the chamber adjacent to the valve seat and having first and second inlet passages and an outlet passage therethrough respectively registering at one end thereof with the first and second inlet ports and the outlet port, a valve plate slidably mounted in the chamber adjacent to the seal member and having a flow control surface thereon cooperating with the other ends of the inlet passages for determining the relative openings thereof and the combined volume of flow therethrough, seal loading means disposed between the valve seat and the seal member for urging the seal member into sealing engagement with the flow control surface of the valve plate, a lever shiftably mounted in the housing adjacent to the valve plate and having a handle at one end thereof and being coupled at the other end thereof to the valve plate for effecting sliding movement thereof with respect to the seal member, the lever and the valve plate being constructed and arranged to accommodate volume control movement of the handle and the valve plate in a first range between a full-on position and a full-off position, the lever and the valve plate being constructed and arranged to accommodate proportion control movement of the handle and the valve plate in a second range between a full-first fluid position and full-second position, the handle and the valve plate being movable between the full-on position and the full-off position for any position of proportion control between the full-first fluid position and the full-second fluid position without changing the proportion control position, whereby the flow control surface cooperates with the passages to deliver first and second fluids from the fluid inlet ports in any desired volume in the first range of movement and in any desired proportions in the second range of movement to change the volume and proportions independently of each other throughout both the first range of movement and the second range of movement.

Another object of this invention is to provide a valve of the type set forth wherein the flow control surface of the valve plate is provided with a mixing cavity therein adapted for registration with the passages, the mixing cavity being shaped and arranged to simultaneously span the outlet passage and only one of the inlet passages and simultaneously to span the outlet passage and substantially one half of each of the inlet passages.

It is another object of this invention to provide a valve of the type set forth, which further includes a bearing member pivotally mounted on the housing in the chamber adjacent to the valve plate for pivotal movement about a first axis, the lever being pivotally mounted in the bearing member for pivotal movement with respect thereto about a second axis in directions only parallel to the first axis.

In connection with the foregoing object, it is another object of this invention to provide a valve of the type set forth, wherein the bearing member has a centrally disposed opening therethrough, one end of the opening being shaped to form a part-cylindrical socket and the other end of the opening being formed to form a slot and extending generally parallel to the first axis, the lever extending through the opening and having a ball portion mounted in the socket for pivotal movement of the lever with respect to the bearing member, the portion of the lever disposed in the slot having a thickness only slightly less than the width of the slot for confining the lever to movement with respect to the bearing member in a direction longitudinally of the slot.

It is another object of this invention to provide a valve of the type set forth, and further including a pivot pin rotatably mounted on the bearing member in the opening and having the longitudinal axis thereof disposed substantially normal to the first axis, the lever extending through the opening and connected to the pivot pin for accommodating pivotal movement of the lever about the longitudinal axis of the pivot pin, while preventing rotational movement of the lever about its longitudinal axis.

It is another object of this invention to provide a valve of the type set forth, wherein the valve plate has a substantially rectangular recess therein, the other end of the lever being shaped complementary to the rectangular recess and receivable therein for effecting sliding movement of the valve plate with respect to the valve seat, while preventing rotational movement of the valve plate with respect to the lever.

Still another object of this invention is to provide a seal loading member for use in a valve including a valve seat and a valve plate and a seal member disposed therebetween wherein the valve seat has inlet and outlet ports therein and the seal member has inlet and outlet passages therethrough respectively registering with the inlet and outlet ports and the valve plate has a mixing cavity therein cooperating with the passages for determining the relative openings thereof and the combined volume of flow therethrough, the seal loading member comprising a carrier plate disposed in use between the associated valve seat and the associated seal member and shaped complementary thereto, an outer elastomeric layer on the outer surfaces of the carrier plate in surrounding and contacting relationship therewith, the carrier plate and the elastomeric layer having a plurality of apertures therethrough respectively registering with the associated ports and the associated passages, a pair of bosses respectively formed in the elastomeric layer on opposite sides of the carrier plate and respectively abutting the associated valve seat and the associated seal member and each defining a plurality of regions respectively surrounding the adjacent ends of the apertures. The regions on one side of the carrier plate having a combined total area substantially equal to the combined total area of the regions on the other side of the carrier plate and greater than the flow area of the mixing cavity in the associated valve plate whereby hydraulic pressure urges the associated seal member and the associated valve plate into sealing engagement with each other.

In connection with the foregoing object, it is another object of this invention to provide a valve of the type set forth including a seal loading member of the type set forth.

It is still another object of this invention to provide a seal loading member for use in a valve including a valve seat and a valve plate and a seal member disposed therebetween wherein the valve seat has inlet and outlet ports therein and the seal member has inlet and outlet passages therethrough respectively registering with the inlet and outlet ports and the valve plate has a mixing cavity therein cooperating with the passages for determining the relative openings thereof and the combined volume of flow therethrough, the seal loading member comprising a carrier plate disposed in use between the associated valve seat of the associated seal member and shaped complementary thereto and having apertures therethrough respectively registering with the associated ports and the associated passages, the opposite sides of the carrier plate being respectively provided with a pair of recesses therein surrounding the opposite ends of the apertures, a pair of gaskets respectively shaped complementary to the recesses and receivable therein for lining the peripheries thereof and respectively abutting the associated valve seat and the associated seal member, each of the gaskets dividing the associated recess into a plurality of regions respectively surrounding the adjacent ends of the apertures, the regions on one side of the carrier plate having a combined total area substantially equal to the combined total area of the regions in the other side of the carrier plate and substantially greater than the flow area of the recesses in the associated valve plate whereby hydraulic pressure urges the associated seal member and the associated valve plate into sealing engagement with each other.

In connection with the following object, it is another object of this invention to provide a valve of the type set forth including a seal loading member of the type set forth.

The invention, both as to its organization and method of operation, together with further objects and advantages thereof, will best be understood by reference to the following specification taken in connection with the accompanying drawings, in which:

FIG. 7 is a view in horizontal section taken along the line 7—7 in FIG. 2 and showing the seal loading gasket;

FIG. 8 is an enlarged fragmentary sectional view taken along the line 8—8 in FIG. 7 and showing further details of the seal loading gasket;

Figures 1, 13:
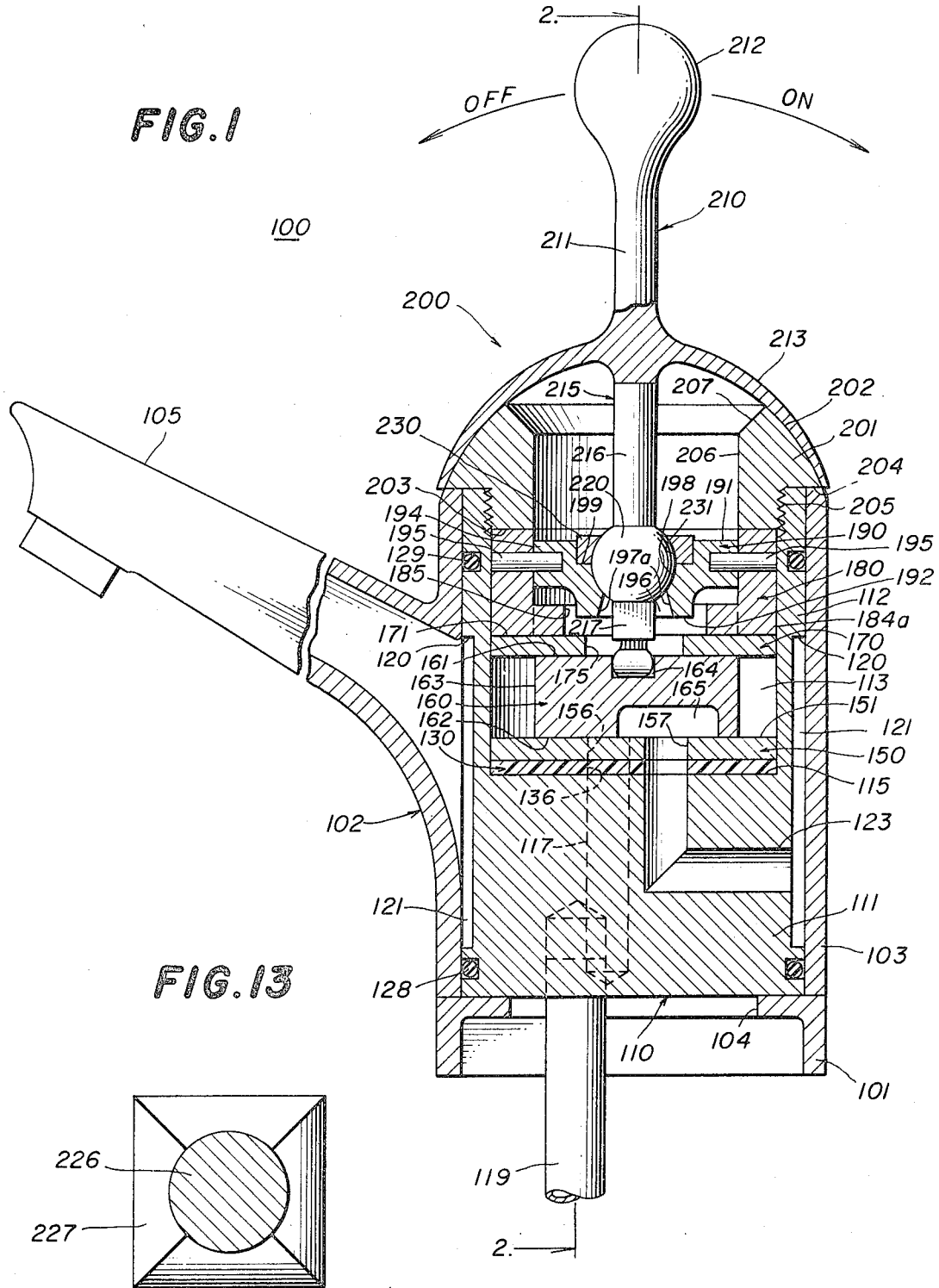
FIG. 1 is a side elevational view in partial section of a single-handle mixing and proportioning valve according to a first embodiment of this invention.
Figure 14:
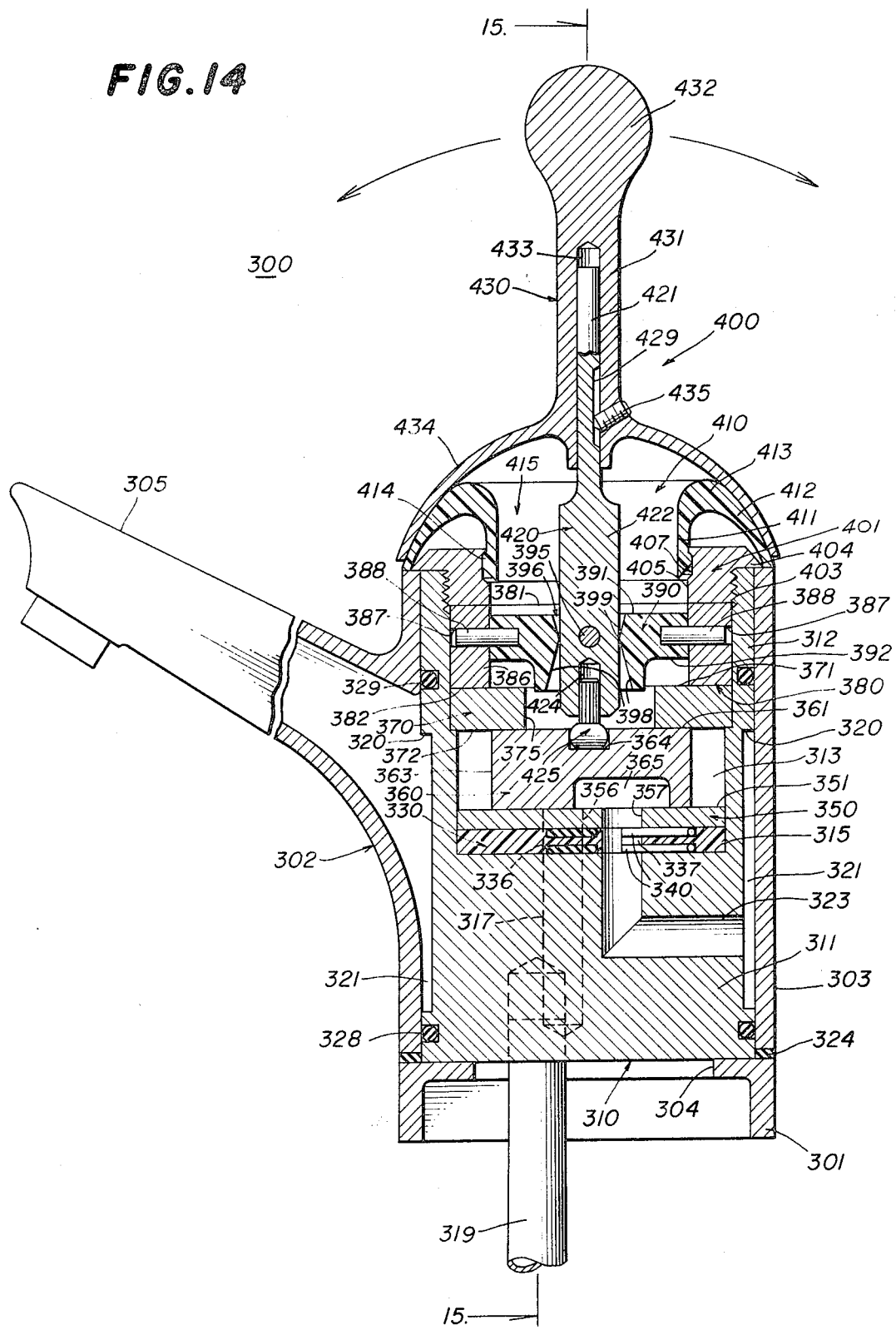
Figure 15:
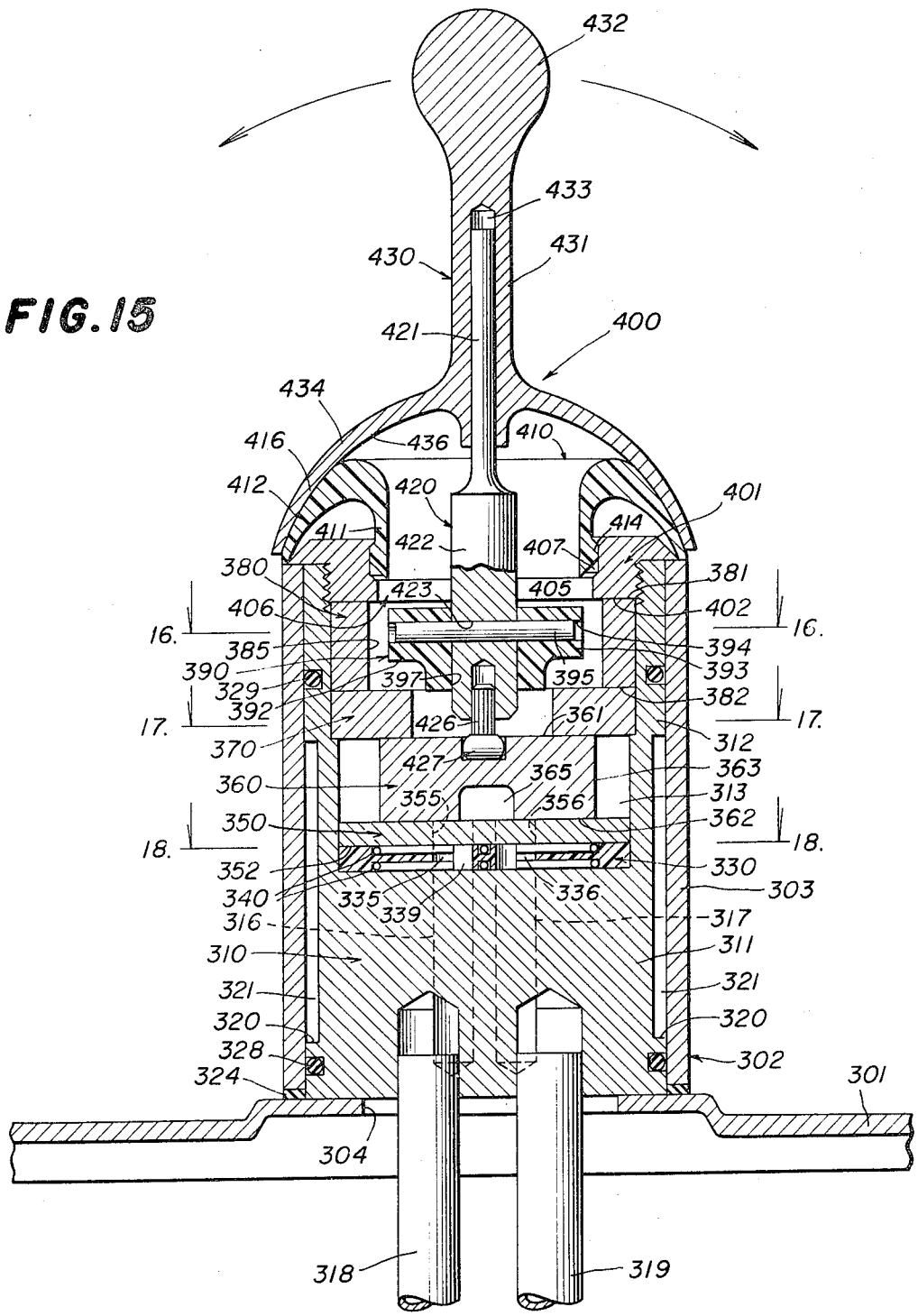
Figure 16:
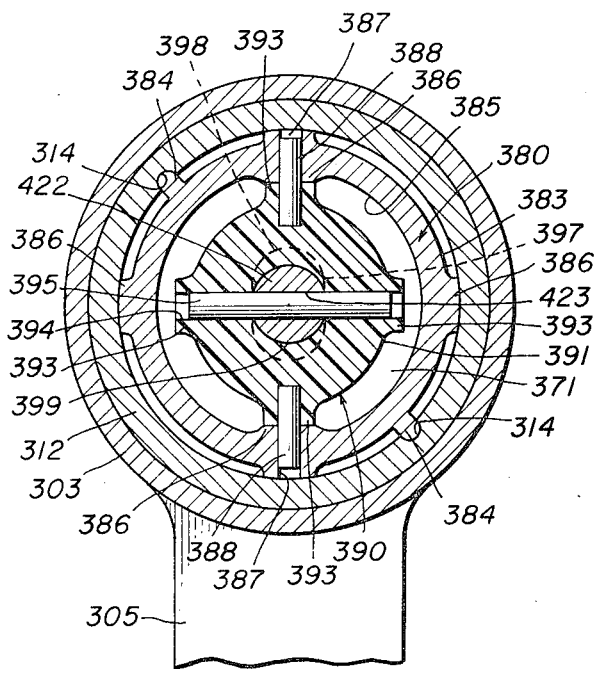
Figure 17:
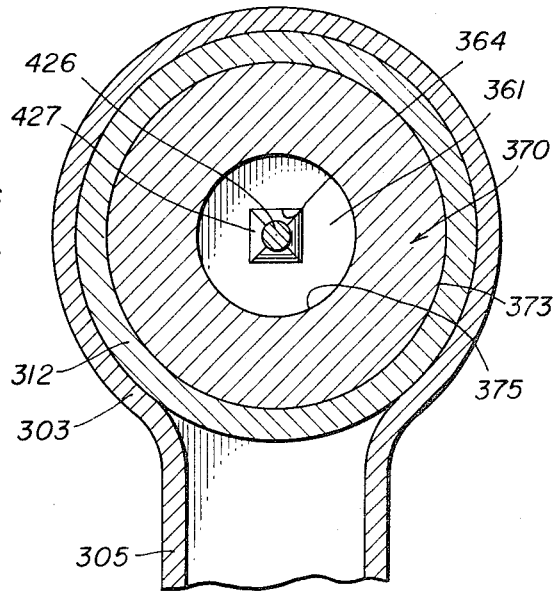
Figure 18:
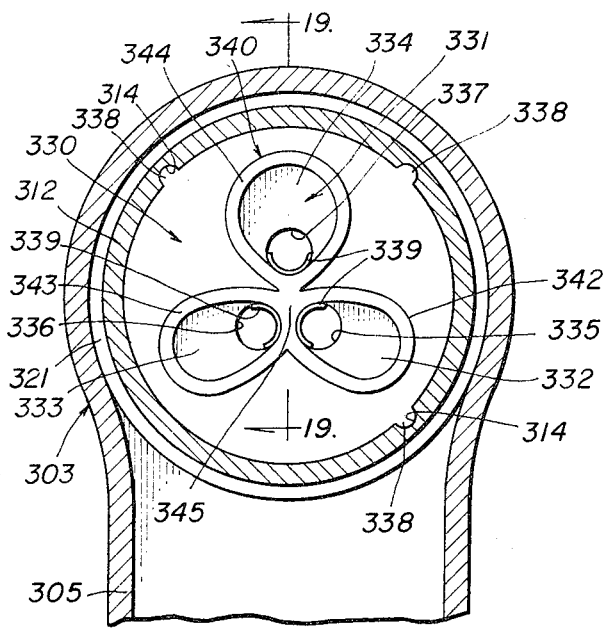
Figure 19:
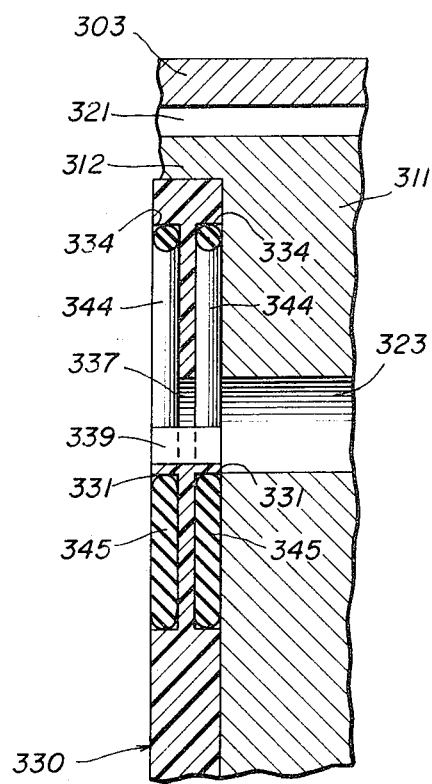

FIG. 9 to FIG. 12, inclusive, are diagrammatical views showing various positions of the valve plate and the corresponding cooperation between the mixing cavity and the inlet and outlet ports;

FIG. 13 is an enlarged view in partial section of the coupling member connecting the lever to the valve plate;

FIG. 14 is a side elevational view in partial section of a single-handle mixing and proportioning valve according to a second embodiment of the invention;

FIG. 15 is a view in vertical section taken along the line 15—15 in FIG. 14;

FIG. 16 is a view in horizontal section taken along the line 16—16 in FIG. 15;

FIG. 17 is a view in horizontal section taken along the line 17—17 in FIG. 16;

FIG. 18 is a view in horizontal section taken along the line 18—18 in FIG. 15; and FIG. 19 is an enlarged fragmentary view in vertical section taken along the line 19—19 in FIG. 18.

Referring now to FIGS. 1 to 8 of the drawings, there is shown a valve assembly, generally designated by the numeral 100, including a base or pedestal 101 for mounting on a sink or other suitable location and a spout assembly 102 mounted on the base 101. The spout assembly 102 is generally cylindrical in shape and circular in cross section and includes a cylindrical wall 103 having a hollow spout 105 extending outwardly from the side thereof and integral therewith. The base 101 has an opening 104 therethrough for accommodating water inlets as will be described hereinafter.

Disposed within the cylindrical wall 103 of the spout assembly 102 and mounted upon the base 101 and overlying the opening 104 is a valve housing or body member, generally designated by the numeral 110. The housing 110 is generally cylindrical in shape and circular in cross section and includes a solid bottom portion 111 and a hollow cylindrical top wall 112 defining a chamber 113 therein. The inner surface of the cylindrical wall 112 is threaded adjacent to the upper end thereof and is provided with a plurality of vertically extending grooves 114 and 114a therein, the purpose of which will be explained more fully hereinafter. At the bottom of the chamber 113, the upper surface of the solid bottom portion 111 forms a flat circular valve seat 115 having therein an inlet port 125, an inlet port 126 and an outlet port 127. The ports 125 to 127 are preferably each circular in outline and equal in diameter and are arranged in a generally triangular pattern about the vertical axis of the housing 110, with the inlet ports 125 and 126 being disposed toward the spout side of the housing 110 and with the outlet port 127 being disposed away from the spout side of the housing 110 as shown, for example, in FIGS. 1, 2 and 6. The solid portion 111 of the housing 110 is provided with two vertically arranged inlet conduits 116 and 117, respectively communicating at the upper ends thereof with the inlet ports 125 and 126 in the valve seat 115. The lower ends of the inlet conduits 116 and 117, respectively communicate with two fluid inlet lines 118 and 119 which extend upwardly through the opening 104 in the base 101 and into the solid bottom portion 111 of the housing 110. Preferably, the valve assembly of this invention is adapted for use with hot and cold water faucets, whereby the fluid inlet lines 118 and 119 will respectively deliver hot and cold water to the valve housing 110. The outer surface of the valve housing 110 has a recessed portion 120 therein extending circumferentially around the housing 110 and cooperating with the cylindrical wall 103 of the spout assembly 102 to define an annular passage 121 communicating with the hollow spout 105 as shown in FIG. 1. An outlet conduit 123 is provided in the solid portion 111 of the housing 110 and communicates at the upper end thereof with the outlet port 127 in the valve seat 115 and communicates at the lower end thereof with the annular passage 121 as shown in FIG. 1. A pair of elastomeric "O" rings 128 and 129 are respectively provided in circumferential grooves adjacent the upper and lower ends of the housing 110 for providing a watertight seal between the housing 110 and the cylindrical wall 103 of the spout assembly 102 above and below the annular passage 121.

Referring now to FIGS. 1, 2, 7 and 8 of the drawings, a circular disk-like seal-loading gasket, generally designated by the numeral 130, is disposed in the chamber 113 on the valve seat 115. The gasket 130 includes an inner rigid circular plate 131 surrounded by an elastomeric layer or coating 133 disposed in surrounding and contacting relationship with the outer surface of the plate 131. The gasket 130 is provided with two inlet apertures 135 and 136 and an outlet aperture 137, all being identical in size and shape to the inlet ports 125 and 126 and the outlet port 127 and respectively registering therewith. Three ears or tabs 139 are spaced about the periphery of the gasket 130 and respectively fit into three complimentary grooves 149 in the inner surface of the hollow top wall 112 for preventing rotational movement of the gasket 130 in the chamber 113, thereby maintaining the apertures 135 to 137 in alignment with the ports 125 to 127. The elastomeric coating 133 has respectively formed on the upper and lower surfaces thereof ridge-like bosses 140, each of the bosses 140 forming three interconnected loops. The loops of the upper boss 140 define three substantially circular regions 145, 146 and 147, respectively surrounding the upper ends of the apertures 135, 136 and 137 and, similarly, the loops of the lower boss 140 define three circular regions 145, 146 and 147 respectively surrounding the lower ends of the apertures 135, 136 and 137. Each of the circular regions 145 to 147 has an area substantially greater than the flow area of the corresponding one of the apertures 135 to 137, and the combined total area of the regions 145 to 147 defined by one of the bosses 140 is substantially equal to the combined total area of the regions 145 to 147 defined by the other of the bosses 140. In use, the lower boss 140 abuts the valve seat 115 for supporting the gasket 130 thereon.

Disposed in the chamber 113 and overlying the gasket 130 is a circular seal member or disk, generally designated by the numeral 150, having a flat planar upper surface 151, a flat planar lower surface 152, and a cylindrical side surface 153 interconnecting the upper and lower surfaces 151 and 152. (See FIGS. 1, 2, 6 and 8.) The side surface 153 has a circumference only slightly less than the circumference of the chamber 113, whereby the seal member 150 fits snugly within the chamber 113 and against the inner surface of the upper wall 112 of the housing 110. The outer surface 153 of the seal member 150 has three tabs or ears 154 spaced therearound and extending outwardly therefrom and respectively received in the grooves 114 in the inner surface of the housing wall 112 for preventing rotational movement of the seal member 150 within the chamber 113. A plurality of substantially cylindrical fluid passages 155, 156 and 157 are provided through the seal member 150 and are respectively aligned with the apertures 135 to 137 in the gasket 130, the lower ends of the passages 155 to 157 being shaped identically to the apertures 135 to 137 in the gasket 130 and respectively registering therewith, and the upper ends of the inlet passages 155 and 156 preferably being substantially square, having side dimensions equal to the diameters of the lower ends of the passages. In use, the lower surface 152 of the seal member 150 contacts the boss 140 on the gasket 130 for supporting the seal member 150 thereupon.

Referring now to FIGS. 1, 2, 5 and 8 of the drawings, a cylindrical valve plate, generally designated by the numeral 160, is disposed in the chamber 113 and overlies the seal member 150, the valve plate 160 having a flat planar upper surface 161, a flat planar lower surface 162 and a cylindrical side surface 163 interconnecting the upper and lower surfaces 161 and 162 at the peripheries thereof. The valve plate 160 has a diameter substantially less than the diameter of the chamber 113, whereby the valve plate 160 is movable laterally within the chamber 113. The lower surface 162 of the valve plate 160 comprises a flow control surface and has formed therein a recess 165 defining a mixing cavity for the valve structure. In the preferred embodiment, the recess 165 has a vertical depth of approximately one-half the thickness of the valve plate 160 and is generally T-shaped in outline, having a generally rectangular base portion 166 disposed toward the spout 105 and a cross portion 167 disposed away from the spout 105 and having arcuate end walls 168 and 169. It will of course be understood, however, that the recess 165 could have any number of shapes depending upon the arrangement of the ports 125 to 127. The recess 165 has a flow area which is substantially less than the combined total area of the regions 145 to 147 defined by one of the bosses 140 on the gasket 130, but is so positioned in the valve plate 160 as to be registrable with the upper ends of passages 155 to 157 in the seal member 150 for controlling the fluid flow therethrough as will be described in detail hereinafter. In the upper surface 161 of the valve plate 160 is formed a centrally disposed generally rectangular recess 164 having a depth preferably less than one-half the thickness of the valve plate 160 for a purpose to be explained below.

Overlying the valve plate 160 and contacting the upper surface 161 thereof is a disk-like bearing plate 170 shaped complementary to the wall 112 of the housing 110 in closely spaced relationship with the inner surface thereof. (See FIGS. 1, 2 and 4.) The bearing plate 170 has a flat planar upper surface 171 and a flat planar lower surface 172 and a cylindrical side surface 173, the side surface 173 having three tabs or ears 174 spaced therearound and respectively received in the grooves 114 in the inner surface of the housing wall 112 for preventing rotational movement of the bearing plate 170 in the chamber 113. Centrally disposed in the bearing plate 170 is an opening 175 extending therethrough, substantially square in cross section and having dimensions substantially greater than the dimensions of the rectangular recess 164 in the upper surface 161 of the valve plate 160.

Figure 3:
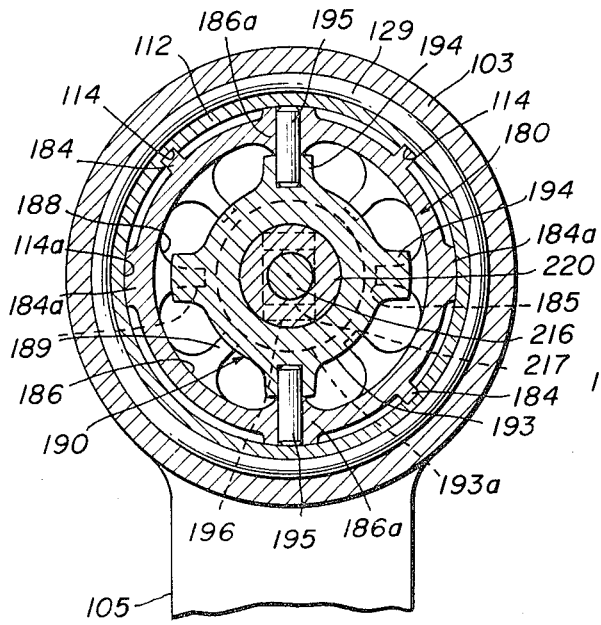
FIG. 3 is a view in horizontal section taken along the line 3—3 in FIG. 2 and showing the lever, bearing member and bearing support structure.
Figure 4:
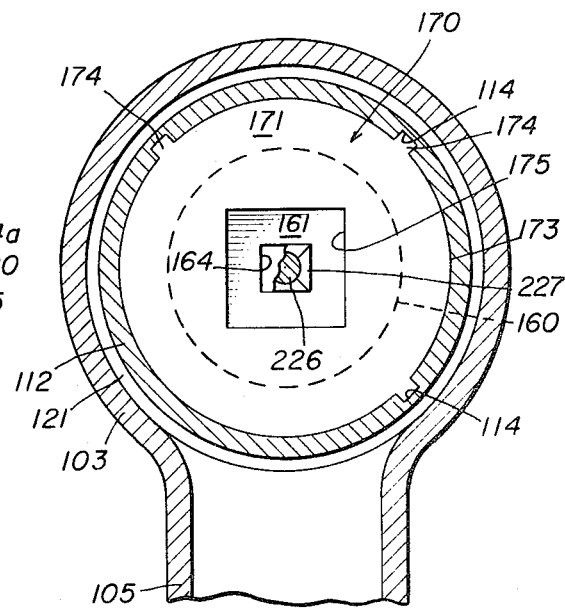
FIG. 4 is a view in horizontal section taken along the line 4—4 in FIG. 2 and showing the bearing plate and the engagement of the lever with the valve plate.
Figure 5:
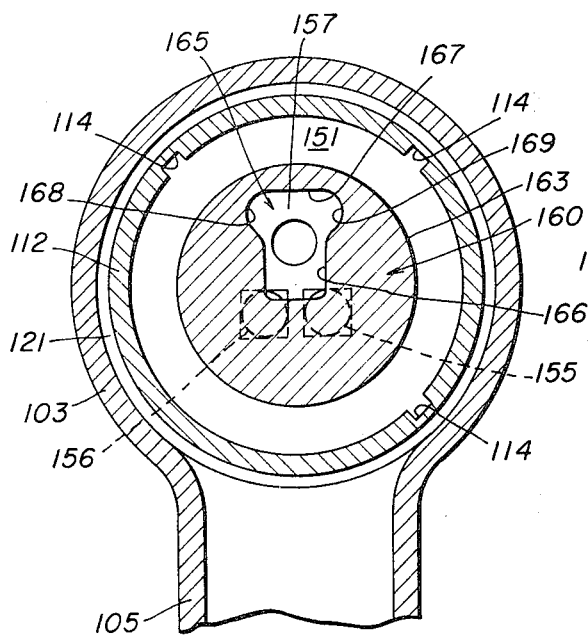
FIG. 5 is a view in horizontal section taken along the line 5—5 in FIG. 2 and showing the valve plate and the mixing recess therein.
Figure 6:
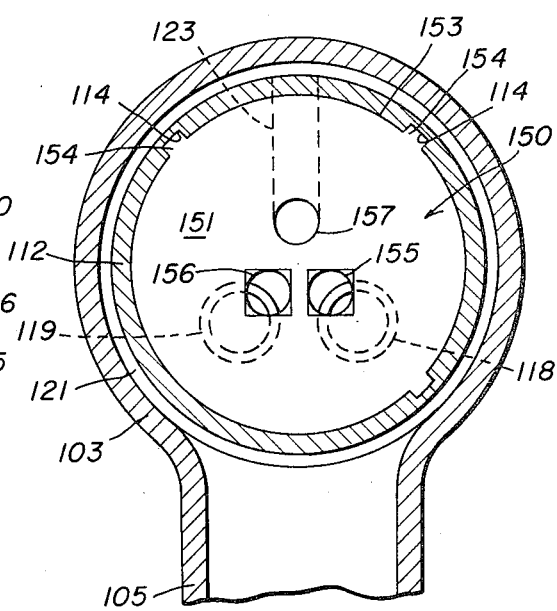
FIG. 6 is a view in horizontal section taken along the line 6—6 in FIG. 2 and showing the seal member.

Overlying the bearing plate 170 and contacting the upper surface 171 thereof is an annular bearing support member, generally designated by the numeral 180, having an upper surface 181, a lower surface 182 and a cylindrical outer side surface 183. The side surface 183 has a diameter somewhat less than the diameter of the chamber 113 and is provided with three radially outwardly extending tabs or ears 184 respectively disposed in the grooves 114 in the inner surface of the housing wall 112 for preventing rotational movement of the bearing support member 180 within the chamber 113. Also extending radially outwardly from the outer surface 183 of the bearing support member 180 are four tabs 184a, equidistantly spaced circumferentially of the support member 180, the outer diameter of the support member 180 through the tabs 184a being only slightly less than the diameter of the inner surface of the housing wall 112. A centrally disposed opening extends through the annular bearing support member 180 and defines an inner cylindrical surface 185, the upper portion of the inner surface 185 being recessed or cut away to form an enlarged-diameter cylindrical surface 186 and a horizontal annular end wall or ledge 187. The portion of the inner surface 185 between the bottom surface 182 and the ledge 187 is provided with a plurality of equidistantly spaced generally arcuate recesses therein, defining a plurality of arcuate recess walls 188 separated by a plurality of prongs or spokes 189 (see FIG. 3). Preferably, the outermost portions of the arcuate recess walls 188 are in vertical alignment with the cylindrical surface 186, while the unrecessed portion of the inner surface 185 defined by the inner ends of the spokes 189 has a circumference slightly greater than the width of the opening 175 through the bearing plate 170. Preferably, the tabs 184a on the outer surface 183 of the bearing support member 180 are arranged to form two pairs of diametrically aligned tabs, one pair being in general alignment with the spout 105 and the other pair being aligned normal to the direction of alignment of the first pair as shown in FIG. 3. The inner surface 186 of the bearing support member 180 has two inwardly extending projections 186a diametrically aligned with the pair of tabs 184a which are aligned with the spout 105. A pair of pivot pins 195 are respectively disposed in corresponding openings in the inwardly extending portions 186a of the bearing support member 180 approximately midway between the upper surface 181 and the end wall or ledge 187, the longitudinal axes of the pivot pins 195 being horizontally aligned along a diameter of the support member 180 and each of the pins 195 extending radially inwardly of inner surface 186 substantially to the inner surface 185.

Disposed within the annular bearing support member 180 is a bearing member, generally designated by the numeral 190, and being generally cylindrical in shape. The bearing member 190 has an upper surface 191, a lower surface 192, and a cylindrical outer side surface 193 having a diameter substantially less than the diameter of the inner surface 186 of the bearing support member 180. Equidistantly spaced about the circumference of the side surface 193 and extending radially outwardly therefrom are four prongs or extensions 194 respectively disposed in radial alignment with the tabs 184a on the bearing support member 180. The prongs 194 have arcuate outer surfaces defining arcs of a circle having a diameter less than the diameter of the inner surface 186 but greater than the diameter of the inner surface 185 on the bearing support member 180. Two of the prongs 194 adjacent to the inwardly extending portions 186a of the bearing support member 180 have openings therein for receiving the inner ends of pivot pins 195, whereby the bearing member 190 is pivotally mounted on the bearing support member 180. The lower end of the cylindrical side surface 193 is cut away or recessed to form a reduced diameter cylindrical wall 183a and an annular end wall 183b, the cylindrical wall 183a having a diameter less than the diameter of the inner surface 185 of the bearing support member 180 and the reduced diameter lower end of the bearing member 190 extending downwardly below the ledge 187 in the bearing support member 180. Centrally disposed in the reduced diameter lower portion of the bearing member 190 is a generally rectangular elongated slot 196 having the major dimension in the direction of alignment of the pivot pins 195. Preferably, the side walls 197 of the slot 196 disposed parallel to the pivot pins 195 extend substantially vertically into the bearing member 190, while the side walls 197a disposed normal to the longitudinal axis of the slot 196 slant inwardly and upwardly toward the center of the bearing member 190 as shown in FIG. 1. The slot 196 communicates at the upper end thereof with a centrally disposed, part-spherical socket 198 in the bearing member 190, the socket 198 communicating at the upper end thereof with a centrally disposed cylindrical recess defining a ledge or end wall 199 in the bearing member 190. The slot 196 and socket 198 and the recess 199 all cooperate to form an opening extending vertically through the bearing member 190 from the upper surface 191 to the lower surface 192 thereof.

Disposed on the upper portion of the housing 110 is a lever assembly, generally designated by the numeral 200. A generally hemispherical lock nut 201 is disposed at the upper end of the housing 110 and includes a hemispherical outer surface 202 and a flat planar bottom surface 203, the lower end of the outer surface 202 being cut away or recessed to form an annular horizontal end wall 204 and a cylindrical reduced diameter side wall 205 extending vertically between the bottom surface 203 and the end wall 204. In use, the lock nut 201 is positioned atop the housing 210 and the spout assembly 102, the reduced diameter side wall 205 being disposed within the upper end of the housing wall 112 and preferably threadedly engaged therewith and the end wall 204 overlying and contacting the upper ends of the housing wall 112 and the cylindrical side wall 103 of the spout assembly 102. In the operative positions shown in the FIGS. 1 and 2, the lower surface 203 of the lock nut 201 abuts the upper surface 181 of the bearing support member 180 and holds the bearing support member 180, the bearing plate 170, the valve plate 160, the seal member 150, the gasket 130, and the valve seat 115 all in engagement with one another and firmly secured in place within the chamber 113. The lock nut 201 has a centrally disposed cylindrical opening 206 therethrough having a diameter substantially equal to the diameter of the inner surface 186 of the bearing support member 180 and registering therewith, the lock nut opening 206 having a countersunk portion 207 at the upper portion thereof.

A lever arm, generally designated by the numeral 210, overlies the lock nut 201, the lever arm 210 including a vertically extending upper shaft 211 having a ball-type handle 212 at the upper end thereof and being integral adjacent to the lower end thereof with a hemispherical cover plate 213, the inner surface of the cover plate 213 being shaped complementary to the outer surface 202 of the lock nut 201 and being adapted for sliding engagement therewith. At the lower end of the upper shaft 211, beneath the cover plate 213 is an externally threaded stud 214. Threadedly engaged with the stud 214 and axially aligned with the upper shaft 211 is a lower or inner shaft, generally designated by the numeral 215, having an upper portion 216 circular in cross section and a lower portion 217 rectangular in cross section, the lower portion 217 having a recess 218 extending axially thereinto from the lower end thereof. Carried by the lower shaft 215 intermediate the ends thereof is a ball portion 220 having a centrally disposed cylindrical opening 221 therein for receiving the shaft 215 therethrough. Preferably, the ball portion 220 is securely attached to the outer surface of the upper portion 216 of the shaft 215 as by soldering, with the lower end of the ball portion 220 abutting against the upper end of rectangular bottom portion 217 of the inner shaft 215. The ball portion 220 is shaped and dimensioned complementary to the socket 198 in the bearing member 190, the lower portion of the ball 220 resting in the socket 198 and slidable therein for accommodating movement of the lever assembly 210 with respect to the bearing member 190. Preferably, the rectangular lower end 217 of the shaft 215 is disposed in the slot 196 in the bearing member 190 and is square in cross section, having dimensions only slightly less than the smaller dimension of the slot 196, whereby the shaft 215 is movable with respect to the bearing member 190 only in the direction of the larger dimension of the slot 196.

Figure 2:
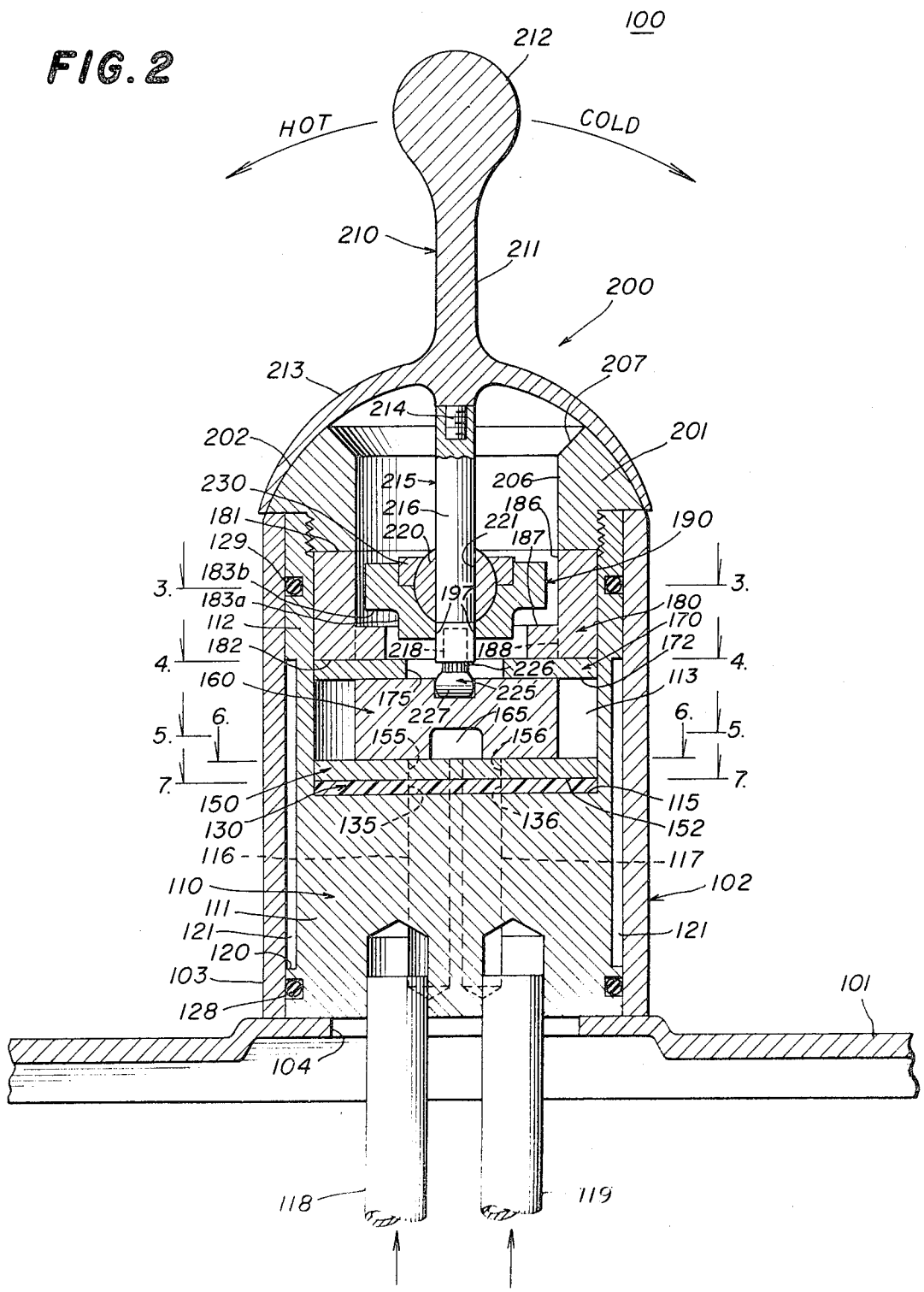
FIG. 2 is a view in vertical section taken along the line 2—2 in FIG. 1.

A coupling member, generally designated by the numeral 225, is provided at the lower end of the shaft 215, the coupling member 225 having at the upper end thereof a stem 226 having a knurled outer surface and being shaped complementary to the recess 218 in the lever end 217 for being force fitted thereinto. Integral with the lower end of the stem 226 is a base portion 227 in the shape of a cylindroidal surfaced rectangular parallelopiped which is formed from four identical half circular cylinders arranged with the longitudinal axes thereof defining a square and with the adjacent ends thereof intersecting, the base portion having lateral dimensions only slightly less than the corresponding dimensions of the rectangular recess 164 in the upper surface 161 of the valve plate 160 and being receivable thereinto for transmitting motion of the lever assembly to the valve plate 160 as will be described more fully hereinafter. Inserted in the cylindrical recess 199 in the upper surface of the bearing support member 190 is an annular bearing cap 230 having an opening therethrough defining a part spherical inner surface 231 shaped complementary to the outer surface of the ball portion 220 on the inner lever shaft 215. In use, the bearing cap 230 is secured to the bearing member 190 as by ultrasonic welding, with the inner surface 231 disposed in surrounding relationship with the upper portion of the ball member 220 and preventing removal therewith from the bearing member 190. Thus, the bearing cap 230 and the ball member 220 cooperate with the inner lever shaft 215 and the outer shaft 211 to hold the cover plate 213 in position overlying the lock nut 201 as shown in FIGS. 1 and 2.

As described above, gasket 130 and the seal member 150 are permanently positioned within the housing 110 so that the apertures 135 to 137 and the passages 155 to 157 are permanently held in alignment with the corresponding ones of the ports 125 to 127 in the valve seat 115. Thus, a path is provided for uninterrupted flow of hot and cold water from the inlet conduits 116 and 117 to the flow control surface 162 of the valve plate 160. The valve plate 160 is slidably movable between the seal member 150 and bearing plate 170 throughout the adjacent portion of the chamber 113. This movement of the bearing plate 160 is accomplished by manual actuation of the lever assembly 200. As described above, the lever arm 210 formed by the shafts 211 and 215 is movable with respect to the bearing member 190 throughout a first range of movement, hereinafter referred to as the "volume control range," only in a direction generally parallel to the axis of the pivot pins 195, i.e., toward the left and right as viewed in FIG. 1. This is because the rectangular lower end 217 of the shaft 215 is shaped to cooperate with the slot 196 in the bearing member 190 so that the rectangular end 217 is movable only in the direction longitudinally of the shaft 296. The limits of this volume control range of lever movement are determined by the sloping sides 197a of the slot 196, the square end 217 of the shaft 215 bearing against the slot sides 197a at the opposite extremes of the volume control range of movement, which will respectively be referred to as the "full-on" and "full-off" positions.

If an attempt is made to move the lever arm 210 in a direction normal to the longitudinal axis of the pivot pins 195, the rectangular end 217 of the shaft 215 will bear against the vertical sides 197 of the slot 196 and cause pivotal movement of the bearing member 190 throughout a second range of movement which will hereinafter be referred to as the "proportion control range," about the axis of the pivot pins 195, i.e., toward the right and left as viewed in FIG. 2. At the opposite extremes of the proportion control range of movement, which will be referred to as the "full-hot" position and the "-full-cold" position, the prongs 194 aligned normal to the axis of the mounting pins 195 will respectively abut against the upper surfaces of adjacent ones of the spokes 189 on the bearing support member 180 to limit the pivotal movement of the bearing member 190. These pivotal movements of the lever arm 210 in directions parallel to and normal to the longitudinal axis of the pivot pins 195 are transmitted to the valve plate 160 through the coupling member 225 to effect corresponding movement thereof. It will be noted that the rectangular shape of the lower end 217 of the shaft 215 cooperates with the rectangular slot 196 to prevent rotational movement of the lever arm 210 about its own longitudinal axis. Similarly, the shape of the base portion 227 of the coupling member 225 cooperates with the rectangular recess 164 in the valve plate 160 to prevent rotational movement of the valve plate 160 with respect to the lever arm 210 while accommodating pivotal movement of the lever arm 210 with respect to the valve plate 160. Thus, the recess 165 in the valve plate 160 will be maintained in the proper orientation with respect to the passages 155 to 157 in the seal member 150.

The recess 165 in the valve plate 160 is shaped and dimensioned so as to be able simultaneously to span the outlet passage 157 and the inlet passage 155 or simultaneously to span the outlet passage 157 and the inlet passage 156. Further, the recess 165 is shaped and dimensioned to be able simultaneously to span the outlet passage and substantially one half of each of the inlet passages 155 and 156. While in the preferred embodiment the recess 165 is generally T-shaped, any shape which will meet the above criteria may be used. It will be noted that upper ends of the inlet passages 155 and 156 are preferably square in shape to facilitate cooperation with the substantially rectangular base portion 166 of the recess 160 so that the ratio of hot water to cold water can be maintained substantially constant when the valve plate 160 is moved between the full-on and full-off positions thereof.

Referring to FIGS. 9 to 12 of the drawings, when the valve plate 160 is in the positions shown in FIGS. 9 and 10, the recess 165 will be disposed in complete registration with the outlet passage 157 and with one of the inlet passages 155 or 156. For example, in FIG. 9 there is shown a position of the valve plate 160 wherein the recess 165 completely spans the outlet passage 157 and the inlet passage 156 but does not register with any portion of the inlet passage 155. In FIG. 10 there is shown a position of the valve plate 160 wherein the recess 165 completely spans the outlet passage 157 and the inlet passage 155 but does not register with any portion of the inlet passage 156. The positions shown in FIGS. 9 and 10 of the drawings illustrate, respectively the full-on, full-hot position and the full-on, full-cold position of the valve plate wherein is respectively provided full flow of hot water with no cold water or full flow of cold water with no hot water.

When the valve plate 160 is disposed in the position shown in FIGS. 11 and 12, the recess 165 will be in registration with the outlet passage 157 but will be completely out of registration with either of the inlet passages 155 or 156. The positions of the valve plate 160 shown in FIGS. 11 and 12 respectively illustrate the full-off, full-hot position and the full-off, full-cold position of the valve assembly which provide zero flow through the valve.

It is a significant feature of this invention that the valve plate 160 is movable throughout the area defined by the upper surface 151 of the seal member 150. Further, the valve plate 160 is movable between any two points on the upper surface 151 of the seal member 150 over an infinite number of rectilinear or curvilinear paths. Thus, the valve plate 160 is movable throughout a volume control range position between a full-on position shown, for example, in FIGS. 9 and 10, and a full-off position shown, for example, in FIGS. 11 and 12. Further, the valve plate 160 is movable throughout a proportion control range of positions between a full-hot position shown, for example, in FIGS. 10 and 12, and a full-cold position shown, for example, in FIGS. 9 and 11. More importantly, however, the valve plate 160 is movable throughout the volume control range between the full-on position and full-off positions for any proportion control position without changing the proportion control position. Similarly, the valve plate 160 is movable throughout the proportion control range between the full-hot position and the full-cold position for any volume control position without changing the volume control position.

In a typical operation of the valve assembly of this invention, if it is desired to open the valve to permit full flow of hot water with no cold water, the handle 212 of the lever arm 210 is moved in the "on" direction indicated by the arrow in FIG. 1 and in the "hot" direction indicated by the arrow in FIG. 2. This motion of the handle 212 will be transmitted through the lever arm assembly to effect a corresponding oppositely directed motion of the valve plate 160 to the position shown in FIG. 10. In this position, hot water will flow from the inlet line 118 through the inlet conduit 116, through the aperture 135 in the gasket 130 and the passage 155 in the seal member 150 into the base portion 166 of the recess 165, into the cross portion 167 of the recess 165 and thence through the outlet passage 157, the outlet aperture 137, and the outlet conduit 123 into the annular passage 121 and out through the spout 105. If it is desired to maintain a full flow volume of water but to alter the proportions to one-half hot water and one-half cold water, the handle 212 of the lever arm 210 is moved in the cold direction indicated by the arrow in FIG. 2 to substantially the position illustrated in FIG. 2. In this position, the base portion 166 of the aperture 165 will be in registration with approximately one-half of the hot water inlet passage 155 and substantially one-half of the cold water inlet passage 156 and will remain in complete registration with the outlet passage 157. In this position, hot and cold water will flow through the corresponding inlets and conduits and be mixed in the recess 165, the mixed fluids then passing out through the outlet passage 157 as described above. It is significant to note that in moving from a full-hot position to a one-half hot and one-half cold position, it is not necessary to alter the full flow volume control position of the handle 212.

Similarly, it is possible to alter the volume of flow from the valve assembly without altering the degree of proportion between hot and cold water. For example, if it is desired to alter the volume of flow from full-flow to half-flow but to maintain the proportion at full-hot, the handle 212 is moved in the off direction indicated by the arrows in FIG. 1 to substantially the position illustrated in FIG. 1. In this position, the cross portion 167 of the aperture 165 will remain in registration with the outlet passage 157, but the base portion 166 of the recess 165 will be in registration with only approximately one half of the hot water inlet passage 155. In this position, a reduced volume of hot water will flow through the valve apparatus. It will be noted that in moving from a full-on position to a substantially half-on position, it is not necessary to alter the full-hot position of the handle 212.

As shown in FIGS. 7 and 8 of the drawings, a seal loading gasket 130 is provided between the valve seat 115 and the seal member 150. The operation of this gasket will now be described. As indicated above, the combined total area of the circular regions 145 to 147 defined by one of the bosses 140 on the gasket 130 is substantially greater than the flow area of the recess 165 in the valve plate 160. Thus, water flowing through the ports 125 to 127 will fill the circular areas 145 to 147 adjacent thereto and similarly will fill the circular areas 145 to 147 above the gasket 130. Thus, the hydraulic pressure exerted in these regions will serve to balance the forces on the gasket 130 and additionally will overcome the pressure in the recess 165 to urge the seal member 150 into sealing engagement with the valve plate 160, thereby providing simple and effective seals between the valve plate 160 and seal member 150. Preferably, the inner plate 131 of the gasket 130 is formed of brass and the outer layer 133 is preferably formed of Buna N rubber which is vulcanized to the outer surface of the inner plate 131. Thus, there is provided a resilient elastomeric coating on the inner plate 131 for providing a resilient contact between the upper boss 140 and the valve seat 115 and the lower boss 140 and the seal member 150 for minimizing the possibility of damage to the surfaces of the valve seat 115 and seal member 150.

In a preferred constructional model of the valve assembly 100 of this invention, the housing 110, the lock nut 201 and the inner shaft 215 are all formed of brass; the spout assembly 102, the outer shaft 211 and the handle 212 are all formed of chromium-plated brass; the ball portion 120 is constructed of bronze and is preferably soldered to the inner shaft 215; the "O" rings 128 and 129 and the bosses 140 are formed of Buna N rubber; the seal member 150, the valve plate 160 and the bearing plate 170 are all formed of alumina or other material having a high aluminum oxide ($Al_2O_3$) content; the bearing support member 180, the bearing member 190 and the bearing cap 230 are all formed of a suitable acetal resin such as that sold under the tradenames "Delrin" or "Celcon;" and the coupling member 225 is formed of tungsten carbide or other suitably hard material.

Referring now to FIGS. 14 to 19 of the drawings, there is shown a second embodiment of the mixing and proportioning valve of this invention, generally designated by the numeral 300. The valve assembly 300 includes a base or pedestal 301 for mounting on a sink or other suitable location and a spout assembly 302 mounted on the base 301. The spout assembly 302 is generally cylindrical in shape and circular in cross section and includes a cylindrical wall 303 having a hollow spout 305 extending outwardly from the side thereof and integral therewith. The base 301 has an opening 304 therethrough for accommodating water inlets, as will be described hereinafter.

Disposed within the central wall 303 of the spout assembly 302 and mounted upon the base 301 and overlying the opening 304 is a valve housing or body member, generally designated by the numeral 310. The housing 310 is generally cylindrical in shape and circular in cross section and includes a solid bottom portion 311 and a hollow central top wall 312 defining a chamber 313 therein. The inner surface of the cylindrical wall 312 has a recessed upper portion 306 which is threaded adjacent to the upper end thereof and is provided with a plurality of vertically extending grooves 314 therein, the lower portion of the inner surface of the cylindrical wall 312 also having vertically extending grooves 314 therein, the purpose of which will be more fully explained hereinafter. At the bottom of the chamber 313, the upper surface of the solid bottom portion 311 of the housing 310 forms a flat circular valve seat 315 having therein two inlet ports 325 and 326 and an outlet port 327. The ports 325 to 327 are preferably each circular in outline and equal in diameter and are arranged in a generally triangular pattern about the vertical axis of the housing 310, with the inlet ports 325 and 326 being disposed toward the spout side of the housing 310 and with the outlet port 327 being disposed away from the spout side of the housing 310 as shown, for example, in FIGS. 14, 15 and 18.

The solid bottom portion 311 of the housing 310 is provided with two vertically arranged inlet conduits 316 and 317, respectively communicating at the upper ends thereof with the inlet ports 325 and 326 in the valve seat 315. The lower ends of the inlet conduits 316 and 317, respectively communicate with two fluid inlet lines 318 and 319 which extend upwardly through the opening 304 in the base 301 and into the solid bottom portion 311 of the housing 310. The outer surface of the valve housing 310 has a recessed portion 320 therein extending circumferentially around the housing 310 and cooperating with the cylindrical wall 303 of the spout assembly 302 to define an annular passage 321 communicating with the hollow spout 305 as shown in FIG. 14. An outlet conduit 323 is provided in the solid bottom portion 311 of the housing 310 and communicates at the upper end thereof with the outlet port 327 in the valve seat 315 and communicates at the lower end thereof with the annular passage 321, as illustrated in FIG. 14. The bottom end of the cylindrical wall 303 of the spout assembly 302 is separated from the base 301 by a plastic ring 324 disposed about the bottom end of the housing 310 in surrounding relationship therewith. A pair of elastomeric "O" rings 328 and 329 are respectively provided in circumferential grooves adjacent to the upper and lower ends of the housing 310 for providing a watertight seal between the housing 310 and the cylindrical wall 303 of the spout assembly 302 above and below the annular passage 321.

A circular disk-like carrier plate, generally designated by the numeral 330 is disposed in the chamber 313 on the valve seat 315. The carrier plate 330 is provided with two inlet apertures 335 and 336 and an outlet aperture 337 extending therethrough, the apertures 335 to 337 all being substantially cylindrical in shape and having diameters substantially equal to the diameters of the ports 325 and 327 and respectively registering therewith. The carrier plate 330 is also provided with a pair of recesses 331 in the upper and lower surfaces thereof, respectively, each of the recesses 331 having a generally cloverleaf shape and including two inlet lobes 332 and 333 and an outlet lobe 334, the lobes 332 to 334 intercommunicating with each other centrally of the apertures 335 to 337. Each of the recesses 331 is shaped to define three substantially semi-cylindrical rims or ridges 339 respectively extending around those portions of the adjacent ends of the apertures 335 to 337 which face inwardly toward the center of the carrier plate 330. Spaced about the periphery of the carrier plate 330 are a plurality of tabs or ears 338 respectively received in the grooves 314 in the inner surface of the housing wall 312 for positioning the carrier plate 330 and preventing rotational movement thereof in the chamber 313, thereby maintaining the apertures 335 to 337 respectively in alignment with the ports 325 to 327. A pair of gaskets 340 is also provided, each of the gaskets 340 being of integral single-piece construction shaped complementary to the recesses 331 and defining three loops 342, 343, and 344, interconnected by a central portion 345. Each of the gaskets 340 is received in an associated one of the recesses 331, with the loops 342 to 344 respectively lining the peripheries of the recess lobes 332 to 334, and with the central portion 345 of the gasket 340 engaging the rims 339 and being confined thereby to the central portion of the recess 331. Each of the recess lobes 332 to 334 and gasket loops 342 to 344 is disposed eccentrically with respect to the adjacent end of the associated one of the apertures 335 to 337 and defines a region having an area substantially greater than the flow area of the associated one of the apertures 335 to 337, with the combined total area of the regions defined by one of the gaskets 340 being substantially equal to the combined total area of the regions defined by the other of the gaskets 340. In use, the gaskets 340 and the carrier plate 330 cooperate to form a seal-loading member, with the lower one of the gaskets 340 abutting against the valve seat 315 for supporting the seal loading member thereon.

Disposed in the chamber 313 and overlying the carrier plate 330 is a circular seal member or disk, generally designated by the numeral 350, having a flat planar upper surface 351, a flat planar lower surface 352 and a cylindrical side surface 353 interconnecting the upper and lower surfaces 351 and 352. The side surface 353 has a circumference only slightly less than the circumference of the chamber 313, whereby the seal member fits snugly within the chamber 313 and against the inner surface of the upper wall 312 of the housing 310. The side surface 353 of the seal member 350 has a plurality of tabs or ears 354 spaced therearound and extending outwardly therefrom and respectively received in the grooves 314 in the inner surface of the housing wall 312 for preventing rotational movement of the seal member 350 within the chamber 313. Three substantially cylindrical fluid passages 355, 356 and 357 are provided through the seal member 350 and are respectively aligned with the apertures 335 to 337 in the carrier plate 330, the lower ends of the passages 355 to 357 being shaped identically to the apertures 335 to 337 in the gasket 330 and respectively registering therewith and the upper ends of the passages 355 to 357 being substantially square in shape, having side dimensions equal to the diameters of the lower ends of the passages. In use, the lower surface 352 of the seal member 350 contacts the upper one of the gaskets 340 in the carrier plate 330 for supporting the seal member 350 thereupon.

A cylindrical valve plate, generally designated by the numeral 360 is disposed in the chamber 313 and overlies the seal member 350, the valve plate 360 having a flat planar upper surface 361, a flat planar lower surface 362 and a cylindrical side surface 363 interconnecting the upper and lower surfaces 361 and 362 at the peripheries thereof. The lower surface 362 of the valve plate 360 contacts the upper surface 351 of the seal member 350 for supporting the valve plate 360 thereon, so that the upper surface 361 of the valve plate 360 is substantially in horizontal alignment with the bottom of the recessed upper portion 306 of the housing wall 312. The valve plate 360 has a diameter substantially less than the diameter of the chamber 313 whereby the valve plate 360 is movable laterally within the chamber 313. The lower surface 362 of the valve plate 360 comprises a flow control surface and has formed therein a recess 365 defining a mixing cavity for the valve assembly. Preferably, the recess 365 has a vertical depth of approximately one half of the thickness of the valve plate 360 and is generally T-shaped in outline, having a generally rectangular base portion 366 disposed toward the spout 305 and a cross portion 367 disposed away from the spout 305 and having arcuate end walls 368 and 369. It will of course be understood, however, that the recess 365 could have any number of shapes, depending upon the arrangement of the ports 325 to 327. The recess 365 is so positioned in the valve plate 360 as to be registrable with the upper ends of the passages 355 to 357 in the seal member 350 for controling the fluid flow therethrough, as was described in connection with the embodiment of FIG. 1. At the upper surface 361 of the valve plate 360 is formed a centrally disposed generally rectangular recess 364 having a depth preferably less than one half of the thickness of the valve plate 360 for a purpose to be explained below.

Overlying the valve plate 360 and contacting the upper surface 361 thereof is a disk-like bearing plate 370 shaped complementary to the upper portion 306 of the housing wall 312 and disposed in closely spaced relationship with the inner surface thereof. The bearing plate 370 has a flat planar upper surface 371 and a flat planar lower surface 372 and a cylindrical side surface 373, the lower surface 372 being supported at the periphery thereof by the bottom of the recessed upper portion 306 of the housing wall 312 and contacting the upper surface 361 of the valve plate 360. Centrally disposed in the bearing plate 370 is a circular opening 375 extending therethrough, the diameter of the opening 375 being substantially greater than the dimensions of the rectangular recess 364 in the upper surface 361 of the valve plate 360.

Overlying the bearing plate 370 and contacting the upper surface 371 thereof is an annular bearing support member, generally designated by the numeral 380, having an upper surface 381, a lower surface 382 and a cylindrical outer side surface 383. The outer side surface 383 has a diameter slightly less than the inner diameter of the upper portion 306 of the housing wall 312 and provided with two radially outwardly extending tabs or ears 384 respectively disposed in the grooves 314 for preventing rotational movement of the bearing support member 380 within the chamber 313. The bearing support member 380 has a substantially cylindrical inner surface 385 defining a central opening extending axially through the bearing support member 380. Equidistantly spaced about the periphery of the bearing supporting member 380 are four projections 386 extending radially outwardly from the outer surface 383 of the bearing support member 380 and engaging the inner surface of the housing wall 312. Two diametrically opposed ones of the projections 386 are disposed substantially in alignment with the spout 305 and extend a slight distance radially inwardly from the inner surface 385 of the bearing support member 380, each of these latter two projections 386 being provided with an opening 387 extending radially therethrough for receiving associated pivot pins 388 therein.

Disposed within the annular bearing support member 380 is a bearing member, generally designated by the numeral 390, and being generally cylindrical in shape. The bearing member 390 has a generally cylindrical side surface 391 having a diameter substantially less than the inner diameter of the bearing support member 380, and having a recessed portion 392 at the lower end thereof. Equidistantly spaced about the periphery of the side surface 391 and extending radially outwardly therefrom are four prongs or extensions 393 respectively disposed in radial alignment with the projections 386 on the bearing support member 380. The two of the prongs 393 aligned with the openings 387 in the bearing support member 380, respectively abut against the inner ends of the adjacent ones of the projections 386 and are each provided with complementary openings therein receiving the other ends of the pivot pins 388, the pivot pins 388 being securely fastened to the associated prongs 393 and being journaled in the openings 387 for pivotally mounting the bearing member 390 on the bearing support member 380. Extending radially through the bearing member 390 and the other two of the prongs 393 thereon is a cylindrical opening 394 for receiving a cylindrical pivot pin 395 therein. Extending axially through the bearing member 390 is a central opening 396, generally oval in transverse cross section, and having a pair of substantially parallel sides 397 extending substantially parallel to the longitudinal axis of the pivot pins 388 and interconnected at the opposite ends thereof by a pair of arcuate ends 398. The arcuate ends 398 are slanted radially inwardly from the upper and lower ends of the bearing member 390, the upper and lower portions of each of the arcuate ends 398 converging inwardly to a point 399 disposed along the longitudinal axis of the pivot pins 388, the points 399 being spaced-apart a distance substantially equal to the distance between the parallel walls 397.

Disposed on the upper portion of the housing 310 is a lever assembly, generally designated by the numeral 400. The lever assembly 400 includes an annular lock nut 401 disposed at the upper end of the housing 310 and extending downwardly thereinto, the lock nut 401 having a bottom surface 402, an externally threaded outer side surface 403, and an upper flange 404 extending radially outwardly from the upper end of the lock nut 401 around the periphery thereof. In use, the side surface 403 of the lock nut 401 is threadedly engaged with the upper end of the recessed portion 306 of the housing wall 312, with the bottom surface 402 of the lock nut 401 abutting against the upper surface 381 of the bearing support member 380 and with the flange 404 overlying and abutting against the upper ends of the housing wall 312 and the cylindrical wall 303 of the spout assembly 302. In this position, the lock nut 401 securely holds the bearing support member 380 and the bearing plate 370 in engagement with each other and firmly in place within the chamber 313. The lock nut 401 has an inner surface 405 defining a central opening 406 therethrough and being provided with a recess 407 extending around the periphery thereof. Disposed atop the lock nut 401 is an annular dome member 410 which is shaped generally like a cylindrical sleeve having the upper end thereof folded downwardly around the lower end thereof for providing a generally U-shaped radial cross section. The dome member 410 has a cylindrical inner wall 411 and an outer wall 412, interconnected at the upper ends thereof by a bight portion 413, the outer wall 412 having a part spherical outer surface 416 and supported at the lower end thereof upon the upper end of the cylindrical wall 303 of the spout assembly 302. The inner wall 411 of the dome member 410 has a ridge 414 extending circumferentially around the outer surface thereof adjacent to the lower end thereof, the ridge 414 being received within the recess 407 in the inner surface 405 of the lock nut 401. Extending axially through the dome member 410 is a central opening 415.

An inner lever shaft 420, substantially cylindrical in transverse cross section, extends axially through the opening 415 in the dome member 410 and through the opening 406 in the lock nut 401, the inner lever shaft 420 including a relatively small diameter upper portion 421 and a relatively large diameter lower portion 422. The lower portion 422 of the inner lever shaft 420 extends downwardly through the opening 396 in the bearing member 390 and into the opening 375 in the bearing plate 370, as illustrated in FIGS. 14 and 15, the lower end 422 of the inner lever shaft 420 having a diameter only slightly less than the distances between the parallel walls 397 of the opening 396 and between the points 399 on the end walls 398, and having an opening 423 extending diametrically therethrough intermediate the ends thereof for receiving the pivot pin 395 therein. Thus, in use, the pivot pin 395 extends entirely through the opening 423 in the inner lever shaft 420 and is secured thereto, the opposite ends of the pivot pin 395 being journalled in the opening 394 in the bearing member 390 as described above for accommodating pivotal movement of the inner lever shaft 420 about the longitudinal axis of the pivot pin 395, which pivotal movement is limited by the slanted arcuate ends 398 of the opening 396 in the bearing member 390. Extending axially into the inner lever shaft 420 from the lower end thereof is a recess 424 for receiving therein the knurled shaft 426 of a coupling member 425. The coupling member 425 is provided at the lower end thereof with a base 427 shaped identically to the base portion 227 of the coupling member 225 described above and having lateral dimensions only slightly less than the corresponding dimensions of the square recess 364 in the bearing plate 360 and received therein. Preferably, the shaft 426 of the coupling member 425 is force fitted into the recess 424, whereby the coupling member 425 is fixed in position with respect to the inner lever shaft 420.

Overlying the dome member 410 is an outer lever shaft, generally designated by the numeral 430, and including a stem 431 having a ball handle 432 at one end thereof and having a substantially hemispherical cover plate 434 at the other end thereof, the inner surface 436 of the cover plate 434 being shaped complementary to the outer surface 416 of the dome member 410. The stem 431 is provided with a slot 433 extending axially thereinto from the lower end thereof for receiving therein the upper end 421 of the inner lever shaft 420. The stem 431 is secured to the inner lever shaft 420 by means of a set screw 435 extending through a complementary opening in the stem 431 and engaging an elongated recess 429 at the upper end 421 of the inner lever shaft 420 (see FIG. 14), the elongated recess 429 accommodating selective positioning of the outer lever shaft 430 with respect to the inner lever shaft 420. In use, the outer lever shaft 430 is so positioned with respect to the inner lever shaft 420 that the inner surface of the hemispherical cover plate 434 lightly contacts the outer surface 416 of the dome member 410, for completely covering the opening 415 through the dome member 410 while permitting sliding movement of the cover plate 434 with respect to the outer surface 416 of the dome member 410.

As described above, the carrier plate 330 and the seal member 350 are permanently positioned within the housing 310 so that the apertures 335 to 337 and the passages 355 to 357 are permanently held in alignment with each other and with the corresponding ones of the ports 325 to 327 in the valve seat 315. Thus, a path is provided for uninterrupted flow of hot and cold water from the inlet conduits 316 and 317 to the flow control surface 362 of the valve plate 360. The valve plate 360 is slidably movable between the seal member 350 and the bearing plate 370 throughout the adjacent portion of the chamber 313. This sliding movement of the valve plate 360 is accomplished by manual actuation of the lever assembly 400, in the same manner as was described with respect to valve assembly 100. Thus, the lever arm formed by the lever shafts 420 and 430 is movable with respect to the bearing member 390 throughout a first "volume control range" of movement, only in a direction generally parallel to the axis of the pivot pins 388, i.e., toward the left and right as viewed in FIG. 14, movement of the lever arm in any other direction being prevented by the pivot pin 395 extending therethrough and by the substantially parallel sides 397 of the opening 396 in the bearing member 390. The limits of this volume control range of lever movement are determined by the sloping arcuate ends 398 of the opening 396, the lower end 422 of the inner lever shaft 420 bearing against these arcuate ends 398 at the opposite extremes of the volume control range of movement, viz., the "full-on" and "full-off" positions. Movement of the lever arm in a direction normal to the longitudinal axis of the pivot pins 388 will result in a pivotal movement of the bearing member 490 throughout a second "proportion control range" of movement, about the longitudinal axis of the pivot pins 388, i.e., toward the right and left as viewed in FIG. 15.

At the opposite extremes of the proportion control range of movement, viz., the "full-hot" position and the "full-cold" position, the prongs 393 aligned with the pivot pin 395 will respectively abut against the upper surface 372 of the bearing plate 370 to limit the pivotal movement of the bearing member 390. These pivotal movements of the lever arm in directions parallel to and normal to the longitudinal axis of the pivot pins 388 are transmitted to the valve plate 360 through the coupling member 425, substantially as described above with respect to FIG. 1, for effecting corresponding sliding movement of the valve plate 360, while preventing rotational movement of the valve plate 360 with respect to the lever arm. Also, it will be noted that rotational movement of the lever shafts 420 and 430 about their own longitudinal axis is prevented by the pivot pin 395.

In operation, the recess 365 in the bearing plate 360 cooperates with the upper ends of the passages 355 to 357 in the seal member 350 to control the volume and proportion of flow therethrough in exactly the same manner as was described with respect to the embodiment of FIG. 1 and, accordingly, this operation will not be here repeated.

In a preferred constructional model of the valve assembly 300 of this invention, the housing 310 and the lock nut 401 are formed of brass; the spout assembly 302, and the outer lever shaft 411 are formed of chromium-plated brass; the "O" rings 328 and 329 and the gaskets 340 are formed of Buna N rubber; the seal member 350, the valve plate 360 and the bearing plate 370 are all formed of Alumina or other material having a high aluminum oxide ($Al_2O_3$) content; the carrier plate 330, the bearing support member 380, the bearing member 390, and the dome member 410 are all formed of a suitable acetal resin such as that sold under the tradenames "Delrin" or "Celcon;" and the inner lever shaft 420 and the coupling member 425 are formed of stainless steel or other suitably hard material.

From the foregoing, it will be seen that there have been provided two embodiments of a single-handle mixing and proportioning valve of simple and economical construction, comprising a minimal number of parts and having a high degree of wear resistance.

There has also been provided two embodiments of an improved seal loading member providing improved hydraulic sealing and reduced wear of the sealing surface.

There has also been provided a valve apparatus which will afford complete volume control and proportion control movement independently of each other.

While there have been described what are at present considered to be the preferred embodiments of the invention, it will be understood that various modifications may be made therein and it is intended to cover in the appended claims all such modifications which fall within the true spirit and scope of the invention.

What is claimed is:

1. A mixing and proportioning valve comprising a housing defining therein a chamber provided with first and second fluid inlet ports for respectively delivering first and second fluids and a fluid outlet port spaced from said fluid inlet ports, a valve seat in said housing at one end of said chamber and disposed between said inlet ports and said outlet port, a seal member mounted in said chamber adjacent to said valve seat and having first and second inlet passages and an outlet passage therethrough respectively registering at one end thereof with said first and second inlet ports and said outlet port, a valve plate slidably mounted in said chamber adjacent to said seal member and having a flow control surface thereon cooperating with the other ends of said inlet passages for determining the relative openings thereof and the combined volume of flow therethrough, seal loading means disposed between said valve seat and said seal member for urging said seal member into sealing engagement with the flow control surface of said valve plate, drive means mounted in said housing and being coupled to said valve plate for effecting sliding movement thereof with respect to said seal member, said drive means and said valve plate being constructed and arranged to accommodate volume control movement of said valve plate in a first range between a full-on position and a full-off position, said drive means and said valve plate being constructed and arranged to accommodate proportion control movement of said valve plate in a second range between a full-first fluid position and a full-second position, said valve plate being movable between said full-on position and said full-off position for any position of proportion control between said full-first fluid position and said full-second fluid position without changing said proportion control position, whereby said flow control surface cooperates with said passages to deliver first and second fluids from said fluid inlet ports in any desired volume in said first range of movement and in any desired proportions in said second range of movements to change the volume and proportions independently of each other throughout both said first range of movement and said second range of movement.

2. The mixing and proportioning valve set forth in claim 1, wherein said ports and said one end of said passages are all circular in shape and equal in diameter, the other ends of said inlet passages being identically rectangular in shape with the facing sides thereof being parallel to each other.

3. The mixing and proportioning valve set forth in claim 1, wherein said housing and said valve plate and said seal member are all cylindrical in shape and substantially circular in cross section.

4. A mixing and proportioning valve comprising a housing defining therein a chamber provided with first and second fluid inlet ports for respectively delivering first and second fluids and a fluid outlet port spaced from said fluid inlet ports, a valve seat in said housing at one end of said chamber and disposed between said inlet ports and said outlet port, a seal member mounted in said chamber adjacent to said valve seat and having first and second inlet passages and an outlet passage therethrough respectively registering at one end thereof with said first and second inlet ports and said outlet port, a valve plate slidably mounted in said chamber adjacent to said seal member and having a flow control surface thereon provided with a recess therein cooperating with the other ends of said inlet passages for determining the relative openings thereof and the combined volume of flow therethrough, a seal loading member disposed between said seal member and said valve seat and having apertures therethrough respectively registering with said ports and said passages, a pair of bosses respectively formed on opposite sides of said seal loading member and respectively abutting said valve seat and said seal member and each defining a plurality of regions respectively surrounding the adjacent ends of said apertures, the regions on one side of said seal loading member having a combined total area substantially equal to the combined total area of the regions on the other side of said seal loading member and greater than the flow area of said recess in said valve plate whereby hydraulic pressure urges said seal member and said valve plate into sealing engagement with each other, and drive means mounted in said housing and being coupled to said valve plate for effecting sliding movement thereof with respect to said seal member, said drive means and said valve plate being constructed and arranged to accommodate volume control movement of said valve plate in a first range between a full-on position and full-off position, said drive means and said valve plate being constructed and arranged to accommodate proportion control movement of said valve plate in a second range between a full-first fluid position and full-second fluid position, said valve plate being movable between said full-on position and said full-off position for any position of proportion control between said full-first fluid position and said full-second fluid position without changing said proportion control position, whereby said flow control surface cooperates with said passages to deliver first and second fluids from said fluid inlet ports in any desired volume in said first range of movement and in any desired proportions in said second range of movement to change the volume and proportions independently of each other throughout both said first range of movement and said second range of movement.

5. The mixing and proportioning valve set forth in claim 4, wherein said gasket includes an inner rigid plate, and an outer elastomeric layer on the outer surfaces of said inner plate in surrounding and contacting relationship therewith, said bosses being formed on said outer layer.

6. The mixing and proportioning valve set forth in claim 4, wherein each of said regions defined by said bosses is generally circular in shape.

7. The mixing and proportioning valve set forth in claim 4, wherein each of said regions defined by said bosses is generally circular in shape and is arranged eccentrically with respect to the associated passage and port.

8. A mixing and proportioning valve comprising a housing defining therein a chamber provided with first and second fluid inlet ports for respectively delivering first and second fluids and fluid outlet port spaced from said fluid inlet ports, a valve seat in said housing at one end of said chamber and disposed between said inlet ports and said outlet port, a seal member mounted in said chamber adjacent to said valve seat and having first and second inlet passages and an outlet passage therethrough respectively registering at one end thereof with said first and second inlet ports and said outlet port, a valve plate slidably mounted in said chamber adjacent to said seal member and having a flow control surface thereon provided with a recess therein cooperating with the other ends of said inlet passages for determining the relative openings thereof and the combined volume of flow therethrough, a seal loading member disposed between said seal member and said valve seat and having apertures therethrough respectively registering with said ports and said passages, the opposite sides of said seal loading member being respectively provided with a pair of recesses therein surrounding the opposite ends of said apertures, a pair of gaskets respectively shaped complementary to said recesses and receivable therein for lining the peripheries thereof and respectively abutting said valve seat and seal member, each of said gaskets dividing the associated recess into a plurality of regions respectively surrounding the adjacent ends of said apertures, the regions on one side of said seal loading member having a combined total area substantially equal to the combined total area of the regions on the other side of said seal loading member and substantially greater than the flow area of said recess in said valve plate whereby hydraulic pressure urges said seal member and said valve plate into sealing engagement with each other, and drive means mounted in said housing and being coupled to said valve plate for effecting sliding movement thereof with respect to said seal member, said drive means and said valve plate being constructed and arranged to accommodate volume control movement of said valve plate in a first range between a full-on position and full-off position, said drive means and said valve plate being constructed and arranged to accommodate proportion control movement of said valve plate in a second range between a full-first fluid position and full-second fluid position, said valve plate being movable between said full-on position and said full-off position for any position of proportion control between said full-first fluid position and said full-second fluid position without changing said proportion control position, whereby said flow control surface cooperates with said passages to deliver first and second fluids from said fluid inlet ports in any desired volume in said first range of movement and in any desired proportions in said second range of movement to change the volume and proportions independently of each other throughout both said first range of movement and said second range of movement.

9. The mixing and proportioning valve set forth in claim 8, wherein said apertures are arranged in a substantially triangular pattern, each of said recesses in said seal loading member comprising three lobes intercommunicating centrally of said triangular pattern and respectively surrounding the adjacent ends of said apertures, and each of said gaskets being of integral single-piece construction and including three loops interconnected centrally of said triangular pattern and respectively seated in the three lobes of the associated recess.

10. The mixing and proportioning valve set forth in claim 8, wherein said apertures are arranged in a substantially triangular pattern, each of said recesses in said seal loading member comprising three lobes intercommunicating centrally of said triangular pattern and respectively surrounding the adjacent ends of said apertures, each of said recesses in said seal loading member defining three substantially semi-cylindrical rims respectively disposed about the portions of the adjacent ends of said apertures facing inwardly of said triangular pattern, and each of said gaskets being of integral single-piece construction and including three loops interconnected centrally of said triangular pattern and respectively seated in the three lobes of the associated recess, said rims serving to prevent said gaskets from obstructing said apertures.

11. A mixing and proportioning valve comprising a housing defining therein a chamber provided with first and second fluid inlet ports for respectively delivering first and second fluids and a fluid outlet port spaced from said fluid inlet ports, a valve seat in said housing at one end of said chamber and disposed between said inlet ports and said outlet port, a seal member mounted in said chamber adjacent to said valve seat and having first and second inlet passages and an outlet passage therethrough respectively registering at one end thereof with said first and second inlet ports and said outlet port, a valve plate slidably mounted in said chamber adjacent to said seal member and having a flow control surface thereon provided with a cavity therein adapted for registration with the other ends of said passages, said cavity being shaped and arranged simultaneously to span said outlet passage and only one of said inlet passages and simultaneously to span said outlet passage and substantially one half of each of said inlet passages, seal loading means disposed between said valve seat and said seal member for urging said seal member into sealing engagement with the flow control surface of said valve plate, drive means mounted in said housing and being coupled to said valve plate for effecting sliding movement thereof with respect to said seal member, said drive means and said valve plate being constructed and arranged to accommodate volume control movement of said valve plate in a first range between a full-on position wherein said cavity is in complete registry with said fluid outlets and a selected combination of said fluid inlets and full-off position wherein said cavity is out of registry with said fluid inlets, said drive means and said valve plate being constructed and arranged to accommodate proportion control movement of said valve plate in a second range between a full-first fluid position wherein said cavity is in complete registry with said fluid outlet and only said second-fluid inlet, said valve plate being movable between said full-on position and said full-off position for any position of proportion control between said full-first fluid position and said full-second fluid position without changing said proportion control position, whereby said flow control surface cooperates with said passages to deliver first and second fluids from said fluid inlet ports in any desired volume in said first range of movement and in any desired proportions in said second range of movement to change the volume and proportions independently of each other throughout both said first range of movement and said second range of movement.

12. The mixing and proportioning valve set forth in claim 11, wherein said passages are arranged in a substantially triangular pattern.

13. The mixing and proportioning valve set forth in claim 11, wherein said passages are arranged in a substantially triangular pattern, said other ends of said inlet passages being identically rectangular in shape with the facing sides thereof disposed parallel to each other and spaced apart a distance less than their width in the direction normal to said facing sides, said cavity being generally T-shaped and having a substantially rectangular base portion disposed toward said inlet passages and a cross portion disposed toward said outlet passage.

14. A single-handle mixing and proportioning valve comprising a housing defining therein a chamber provided with first and second fluid inlet ports for respectively delivering first and second fluids and a fluid outlet port spaced from said fluid inlet ports, a valve seat in said housing at one end of said chamber and disposed between said inlet ports and said outlet port, a valve plate slidably mounted in said chamber adjacent to said valve seat and having a substantially rectangular recess therein and having a flow control surface thereon cooperating with said inlet ports for determining the relative openings thereof and the combined volume of flow therethrough, a bearing member pivotally mounted on said housing in said chamber adjacent to said valve plate for pivotal movement about a first axis, a lever pivotally mounted in said bearing member for pivotal movement with respect thereto about a second axis in directions only parallel to said first axis, said lever having a handle at one end thereof and being provided at the other end thereof with a coupling member having an outer surface shaped to form four intersecting semi-cylinders arranged with the axes thereof defining a rectangle and being receivable in said rectangular recess in said valve plate for coupling said lever to said valve plate for effecting sliding movement thereof with respect to said valve seat, said lever and said bearing member cooperating to accommodate volume control movement of said handle and said valve plate in a first range between a full-on position and a full-off position when said lever pivots about said second axis, said lever and said bearing member cooperating to accommodate proportion control movement of said handle and said valve plate in a second range between a full-first fluid position and full-second fluid position when said lever pivots with said bearing member about said first axis, said handle and said valve plate being movable between said full-on position and said full-off position for any position of proportion control between said full-first fluid position and said full-second fluid position without changing said proportion control position, whereby said flow control surface cooperates with said passages to deliver first and second fluids from said fluid inlet ports in any desired volume in said first range of movement and in any desired proportions in said second range of movement to change the volume and proportions independently of each other throughout both said first range of movement and said second range of movement.

15. A single-handle mixing and proportioning valve comprising a housing defining therein a chamber provided with first and second fluid inlet ports for respectively delivering first and second fluids and a fluid outlet port spaced from said fluid inlet ports, a valve seat in said housing at one end of said chamber and disposed between said inlet ports and said outlet port, a valve plate slidably mounted in said chamber adjacent to said valve seat and having a flow control surface thereon cooperating with said inlet ports for determining the relative openings thereof and the combined volume of flow therethrough, a bearing member pivotally mounted on said housing in said chamber adjacent to said valve plate for pivotal movement about a first axis and having a centrally disposed opening therethrough, one end of said opening being shaped to form a part-spherical socket and the other end of said opening being shaped to form a slot adjacent to said valve plate and extending generally parallel to said first axis, a lever extending through said opening and having a ball portion mounted in said socket for pivotal movement of said lever with respect to said bearing member, said lever having a handle at one end thereof and being coupled at the other end thereof to said valve plate for effecting sliding movement thereof with respect to said valve seat, the portion of said lever disposed in said slot having a thickness only slightly less than the width of said slot for confining said lever to movement with respect to said bearing member in a direction longitudinally of said slot, said lever and said bearing member cooperating to accommodate volume control movement of said handle and said valve plate in a first range between a full-on position and a full-off position when said lever moves longitudinally of said slot, said lever and said bearing member cooperating to accommodate proportion control movement of said handle and said valve plate in a second range between a full-first fluid position and a full-second fluid position when said lever pivots with said bearing member about said first axis, said handle and said valve plate being movable between said full-on position and said full-off position for any position of proportion control between said full-first fluid position and said full-second fluid position without changing said proportion control position, whereby said flow control surface cooperates with said passages to deliver first and second fluids from said fluid inlet ports in any desired volume in said first range of movement and in any desired proportions in said second range of movement to change the volume and proportions independently of each other throughout both said first range of movement and said second range of movement.

16. The single-handle mixing and proportioning valve set forth in claim 15, and further including an annular bearing cap connected to said bearing member adjacent to said one end of said opening, the inner surface of said bearing cap being shaped complementary to said part-spherical socket and forming a continuation thereof for confining said ball to said socket and preventing removal of said lever from said bearing member.

17. A single-handle mixing and proportioning valve comprising a housing defining therein a chamber provided with first and second fluid inlet ports for respectively delivering first and second fluids and a fluid outlet port spaced from said fluid inlet ports, a valve seat in said housing at one end of said chamber and disposed between said inlet ports and said outlet port, a valve plate slidably mounted in said chamber adjacent to said valve seat and having a substantially rectangular recess therein and having a flow control surface thereon cooperating with said inlet ports for determining the relative openings thereof and the combined volume of flow therethrough, a bearing member pivotally mounted on said housing in said chamber adjacent to said valve plate for pivotal movement about a first axis and having a centrally disposed opening therethrough, a pivot pin rotatably mounted on said bearing member in said opening and having the longitudinal axis thereof disposed substantially normal to said first axis, a lever extending through said opening and connected to said pivot pin for accommodating pivotal movement of said lever about the longitudinal axis of said pivot pin while preventing rotational movement of said lever about its own longitudinal axis, said lever having a handle at one end thereof and being provided at the other end thereof with a coupling member having an outer surface shaped to form four intersecting semi-cylinders arranged with the axes thereof defining a rectangle and being receivable in said rectangular recess in said valve plate for coupling said lever to said valve plate for effecting sliding movement thereof with respect to said valve seat, said lever and said bearing member cooperating to accommodate volume control movement of said handle and said valve plate in a first range between a full-on position and a full-off position when said lever pivots on said pivot pin, said lever and said bearing member cooperating to accommodate proportion control movement of said handle and said valve plate in a second range between a full-first fluid position and a full-second fluid position when said lever pivots with said bearing member about said first axis, said handle and said valve plate being movable between said full-on position and said full-off position for any position of proportion control between said full-first fluid position and said full-second fluid position without changing said proportion control position, whereby said flow control surface cooperates with said passages to deliver first and second fluids from said fluid inlet ports in any desired volume in said first range of movement and in any desired proportions in said second range of movement to change the volume and proportions independently of each other throughout both said first range of movement and said second range of movement.

18. A single-handle mixing and proportioning valve comprising a housing defining therein a chamber provided with first and second fluid inlet ports for respectively delivering first and second fluids and a fluid outlet port spaced from said fluid inlet ports, a valve seat in said housing at one end of said chamber and disposed between said inlet ports and said outlet port, a valve plate slidably mounted in said chamber adjacent to said valve seat and having a substantially rectangular recess therein and having a flow control surface thereon cooperating with said inlet ports for determining the relative openings thereof and the combined volume of flow therethrough, a bearing member pivotally mounted on said housing in said chamber adjacent to said valve plate for pivotal movement about a first axis, a lever pivotally mounted in said bearing member for pivotal movement with respect thereto about a second axis in directions only parallel to said first axis, said lever and said bearing member being constructed and arranged to prevent rotational movement of said lever about the longitudinal axis thereof, one end of said lever having a handle thereon and the other end of said lever being provided with a coupling member having an outer surface shaped to form four intersecting semi-cylinders arranged with the axes thereof defining a rectangle and being receivable in said rectangular recess for effecting sliding movement of said valve plate with respect to said valve seat, said other end of said lever being shaped and dimensioned for cooperation with said rectangular recess to permit pivotal movement of said lever with respect to said valve plate while preventing rotational movement of said valve plate with respect to said lever, said lever and said bearing member cooperating to accommodate volume control movement of said handle and said valve plate in a first range between a full-on position and a full-off position when said lever pivots about said second axis, said lever and said bearing member cooperating to accommodate proportion control movement of said handle and said valve plate in a second range between a full-first fluid position and a full-second fluid position when said lever pivots with said bearing member about said first axis, said handle and said valve plate being movable between said full-on position and said full-off position for any position of proportion control between said full-first fluid position and said full-second fluid position without changing said proportion control position, whereby said flow control surface cooperates with said passages to deliver first and second fluids from said fluid inlet ports in any desired volume in said first range of movement and in any desired proportions in said second range of movement to change the volume and proportions independently of each other throughout both said first range of movement and said second range of movement.

19. A single-handle mixing and proportioning valve comprising a housing defining therein a chamber provided with first and second fluid inlet ports for respectively delivering first and second fluids and a fluid outlet port spaced from said fluid inlet ports, a valve seat in said housing at one end of said chamber and disposed between said inlet ports and said outlet port, a seal member mounted in said chamber adjacent to said valve seat and having first and second inlet passages and an outlet passage therethrough respectively registering at one end thereof with said first and second inlet ports and said outlet port, a valve plate slidably mounted in said chamber adjacent to said seal member and having a flow control surface thereon provided with a recess therein cooperating with the other ends of said inlet passages for determining the relative openings thereof and the combined volume of flow therethrough, a seal loading member disposed between said seal member and said valve seat and having apertures therethrough respectively registering with said ports and said passages, a pair of bosses respectively formed on opposite sides of said seal loading member and respectively abutting said valve seat and said seal member and each defining a plurality of regions respectively surrounding the adjacent ends of said apertures, the regions on one side of said seal loading member having a combined total area substantially equal to the combined total area of the regions on the other side of said seal loading member and greater than the flow area of said recess in said valve plate whereby hydraulic pressure urges said seal member and said valve plate into sealing engagement with each other, a bearing member pivotally mounted on said housing in said chamber adjacent to said valve plate for pivotal movement about a first axis, and a lever pivotally mounted in said bearing member for pivotal movement with respect thereto about a second axis in directions only parallel to said first axis, said lever having a handle at one end thereof and being coupled at the other end thereof to said valve plate for effecting sliding movement thereof with respect to said valve seat, said lever and said bearing member cooperating to accommodate volume control movement of said handle and said valve plate in a first range between a full-on position and a full-off position when said lever pivots about said second axis, said lever and said bearing member cooperating to accommodate proportion control movement of said handle and said valve plate in a second range between a full-first fluid position and a full-second fluid position when said lever pivots with said bearing member about said first axis, said handle and said valve plate being movable between said full-on position and said full-off position for any position of proportion control between said full-first fluid position and said full-second fluid position without changing said proportion control position, whereby said flow control surface cooperates with said passages to deliver first and second fluids from said fluid inlet ports in any desired volume in said first range of movement and in any desired proportions in said second range of movement to change the volume and proportions independently of each other throughout both said first range of movement and said second range of movement.

20. A single-handle mixing and proportioning valve comprising a housing defining therein a chamber provided with first and second fluid inlet ports for respectively delivering first and second fluids and a fluid outlet port spaced from said fluid inlet ports, a valve seat in said housing at one end of said chamber and disposed between said inlet ports and said outlet port, a seal member mounted in said chamber adjacent to said valve seat and having first and second inlet passages and an outlet passage therethrough respectively registering at one end thereof with said first and second inlet ports and said outlet port, a valve plate slidably mounted in said chamber adjacent to said seal member and having a flow control surface thereon provided with a recess therein cooperating with the other ends of said inlet passages for determining the relative openings thereof and the combined volume of flow therethrough, a seal loading member disposed between said seal member and said valve seat and having apertures therethrough respectively registering with said ports and said passages, the opposite sides of said seal loading member being respectively provided with a pair of recesses therein surrounding the opposite ends of said apertures, a pair of gaskets respectively shaped complementary to said recesses and receivable therein for lining the peripheries thereof and respectively abutting said valve seat and said seal member, each of said gaskets dividing the associated recess into a plurality of regions respectively surrounding the adjacent ends of said apertures, the regions on one side of said seal loading member having a combined total area substantially equal to the combined total area of the regions on the other side of said seal loading member and substantially greater than the flow area of said recess in said valve plate whereby hydraulic pressure urges said seal member and said valve plate into sealing engagement with each other, a bearing member pivotally mounted on said housing in said chamber adjacent to said valve plate for pivotal movement about a first axis, and a lever pivotally mounted in said bearing member for pivotal movement with respect thereto about a second axis in directions only parallel to said first axis, said lever having a handle at one end thereof and being coupled at the other end thereof to said valve plate for effecting sliding movement thereof with respect to said valve seat, said lever and said bearing member cooperating to accommodate volume control movement of said handle and said valve plate in a first range between a full-on position and a full-off position when said lever pivots about said second axis, said lever and said bearing member cooperating to accommodate proportion control movement of said handle and said valve plate in a second range between a full-first fluid position and a full-second fluid position when said lever pivots with said bearing member about said first axis, said handle and said valve plate being movable between said full-on position and said full-off position for any position of proportion control between said full-first fluid position and said full-second fluid position without changing said proportion control position, whereby said flow control surface cooperates with said passages to deliver first and second fluids from said fluid inlet ports in any desired volume in said first range of movement and in any desired proportions in said second range of movement to change the volume and proportions independently of each other throughout both said first range of movement and said second range of movement.

21. A single-handle mixing and proportioning valve comprising a housing defining therein a chamber provided with first and second fluid inlet ports for respectively delivering first and second fluids and a fluid outlet port spaced from said fluid inlet ports, a valve seat in said housing at one end of said chamber and disposed between said inlet ports and said outlet port, a valve plate slidably mounted in said chamber adjacent to said valve seat and having a flow control surface thereon cooperating with said inlet ports for determining the relative openings thereof and the combined volume of flow therethrough, a bearing support disposed in said chamber adjacent to said valve plate and having a centrally disposed opening therethrough, a bearing member disposed in said opening adjacent to said valve plate and pivotally mounted on said support for pivotal movement with respect thereto about a first axis, a lever pivotally mounted in said bearing member for pivotal movement with respect thereto about a second axis in directions only parallel to said first axis, said lever having a handle at one end thereof and being coupled at the other end thereof to said valve plate for effecting sliding movement thereof with respect to said valve seat, said lever and said bearing member cooperating to accommodate volume control movement of said handle and said valve plate in a first range between a full-on position and a full-off position when said lever pivots about said second axis, said lever and said bearing member cooperating to accommodate proportion control movement of said handle and said valve plate in a second range between a full-first fluid position and a full-second fluid position when said lever pivots with said bearing member about said first axis, said handle and said valve plate being movable between said full-on position and said full-off position for any position of proportion control between said full-first fluid position and said full-second fluid position without changing said proportion control position, whereby said flow control surface cooperates with said passages to deliver first and second fluids from said fluid inlet ports in any desired volume in said first range of movement and in any desired proportions in said second range of movement to change the volume and proportions independently of each other throughout both said first range of movement and said second range of movement.

* * * * *